United States Patent
Wakabayashi et al.

(10) Patent No.: US 9,453,539 B2
(45) Date of Patent: Sep. 27, 2016

(54) CLUTCH COVER ASSEMBLY

(75) Inventors: Hirokazu Wakabayashi, Katano (JP);
Norihiko Tanigawa, Suzuka (JP);
Nobuhiko Matsumoto, Neyagawa (JP)

(73) Assignee: EXEDY Corporation, Osaka (JP)

( * ) Notice: Subject to any disclaimer, the term of this patent is extended or adjusted under 35 U.S.C. 154(b) by 704 days.

(21) Appl. No.: 13/824,115

(22) PCT Filed: Aug. 8, 2011

(86) PCT No.: PCT/JP2011/068027
§ 371 (c)(1),
(2), (4) Date: Mar. 15, 2013

(87) PCT Pub. No.: WO2012/039202
PCT Pub. Date: Mar. 29, 2012

(65) Prior Publication Data
US 2013/0168200 A1 Jul. 4, 2013

(30) Foreign Application Priority Data
Sep. 24, 2010 (JP) .................................. 2010-213845

(51) Int. Cl.
*F16D 13/75* (2006.01)
*F16D 13/58* (2006.01)

(52) U.S. Cl.
CPC ............. *F16D 13/58* (2013.01); *F16D 13/757* (2013.01)

(58) Field of Classification Search
CPC .................................................... F16D 13/757
See application file for complete search history.

(56) References Cited

U.S. PATENT DOCUMENTS

| | | | | |
|---|---|---|---|---|
| 5,727,666 A | * | 3/1998 | Maucher | F16D 13/585 192/111.19 |
| 5,845,750 A | * | 12/1998 | Thirion De Briel | F16D 13/757 188/196 V |
| 5,927,457 A | * | 7/1999 | Orlamunder | F16D 13/757 192/111.17 |
| 6,193,039 B1 | * | 2/2001 | Doremus | F16D 13/75 192/111.17 |
| 2004/0069587 A1 | * | 4/2004 | Weidinger | F16D 13/757 192/70.252 |

FOREIGN PATENT DOCUMENTS

| | | |
|---|---|---|
| JP | 08-135678 A | 5/1996 |
| JP | 08-170652 A | 7/1996 |
| JP | 10-227317 A | 8/1998 |
| JP | 10-509502 A | 9/1998 |
| JP | 2000-002267 A | 1/2000 |
| JP | 2002-357231 A | 12/2002 |
| JP | 2003-028193 A | 1/2003 |
| JP | 2006-144819 A | 6/2006 |
| WO | 97-10448 A | 3/1997 |

* cited by examiner

*Primary Examiner* — Robert Hodge
*Assistant Examiner* — Terry Chau
(74) *Attorney, Agent, or Firm* — Global IP Counselors, LLP

(57) ABSTRACT

A clutch cover assembly is provided whereby accurate wear compensation can be executed. The present clutch cover assembly includes a clutch cover, a pressure plate, a diaphragm spring, an wear-amount detecting mechanism and an wear tracking mechanism. The wear-amount detecting mechanism includes a detection member for detecting the wear-amount of a friction member and a moving member configured to be movable in accordance with the wear-amount of the friction member. The detection member is engaged with the fulcrum rings and detects the wear-amount through the fulcrum rings, while being engaged with the moving member and being configured to be disengaged from the moving member at a predetermined wear-amount.

10 Claims, 11 Drawing Sheets

CLUTCH COVER ASSEMBLY

CROSS-REFERENCE TO RELATED APPLICATIONS

This national phase application claims priority to Japanese Patent Application No. 2010-213845 filed on Sep. 24, 2010. The entire disclosure of Japanese Patent Application No. 2010-213845 is hereby incorporated herein by reference.

BACKGROUND

1. Technical Field

The present invention relates to a clutch Cover assembly, and particularly to a clutch cover assembly for pressing a friction member of the clutch disc assembly onto a flywheel of an engine and for releasing the pressing.

2. Background Art

In general, a clutch cover assembly is attached to a flywheel of an engine and is used for transmitting the driving force of the engine towards a transmission. Such a clutch cover assembly mainly includes a clutch cover, a pressure plate, and a diaphragm spring. The clutch cover is fixed to the flywheel. The pressure plate is pressed towards the flywheel by the diaphragm spring, and holds a friction member of the clutch disc assembly together with the flywheel while interposing the friction member therebetween. The diaphragm spring has a function of pressing the pressure plate, and also has a lever function of releasing the pressure onto the pressure plate.

When the wear of the friction member of the clutch disc assembly herein progresses due to the load characteristic of the diaphragm spring, the pressure load onto the friction member is increased. Therefore, when the friction member is abraded, a large load is required for executing a release operation and a clutch pedal tread force is inevitably increased.

In view of the above, as described in Patent Literature 1, for instance, a wear compensation mechanism has been provided whereby increase in pressing load can be inhibited by returning the posture of a diaphragm spring to its initial state even when a friction member is abraded.

The wear compensation mechanism mainly includes: a fulcrum ring disposed between a pressure plate and the diaphragm spring; an urging mechanism configured to urge the fulcrum spring in a direction away from the pressure plate; and a wear-amount detecting mechanism configured to detect the wear-amount of the friction member. The diaphragm spring is herein configured to be able to press the pressure plate through the fulcrum spring. The diaphragm spring is kept in its initially set posture by moving the fulcrum spring in a direction away from the pressure plate in accordance with the wear-amount of the friction member.

CITATION LIST

Patent Literature

PTL 1: Japan Laid-open Patent Application Publication No. JP-A-H10-227317

SUMMARY

Technical Problems

In the well-known clutch cover assembly, the wear-amount detecting mechanism is configured to detect the wear-amount of the friction member. The wear-amount detecting mechanism is formed by a bushing held onto the clutch cover and a bolt penetrating the bushing. In thus structured wear-amount detecting mechanism, the tip of the bolt is attached to the pressure plate. Therefore, when the friction member is abraded, the bolt is moved together with the pressure plate towards the flywheel. Further, the bushing is held onto the clutch cover, and therefore an axial clearance corresponding to the wear-amount is produced between the bushing and the fulcrum spring.

When a release action is herein executed, the pressure plate and the fulcrum ring are moved in a direction away from the flywheel and the fulcrum ring is abutted to the bushing. Accordingly, the fulcrum ring is returned to the same axial position as the pre-wear axial position, and the diaphragm spring is kept at its initially set posture.

In the well-known wear-amount detecting mechanism as described above, the wear-amount of the friction member is configured to be detected based on the axial displacement of the bolt, i.e., the axial displacement of the pressure plate. However, the well-known structure has chances that the pressure plate is axially vibrated when engine vibrations or the like are inputted into the clutch cover assembly in executing a release action. Therefore, chances are that vibrations of the pressure plate are transmitted, as impact force, to the bushing through the fulcrum ring, and accordingly, the bushing is further moved towards the transmission. When the bushing is herein further moved towards the transmission, the fulcrum ring is moved by the amount equal to or greater than the wear-amount. Therefore, chances have been that accurate wear compensation cannot be provided.

It is an advantage of the present invention to provide a clutch cover assembly whereby accurate wear compensation can be executed.

Solution to Problems

A clutch cover assembly according to a first aspect of the invention is the one for pressing a friction member of a clutch disc assembly onto a flywheel of an engine and for releasing the pressing of the friction member.

The clutch cover assembly includes a clutch cover fixed to the flywheel, a pressure plate, a pressing member, a wear-amount detecting mechanism and a wear tracking mechanism. The pressure plate is the one for pressing the friction member onto the flywheel. The pressure plate is coupled to the clutch cover while being non-rotatable relatively thereto. The pressing member is the one for pressing the pressure plate towards the flywheel. The pressing member is supported by the clutch cover. The wear-amount detecting mechanism is attached to the clutch cover. The wear-amount detecting mechanism includes: a detection member for detecting a wear-amount of the friction member; and a moving member configured to be movable in accordance with the wear-amount. The wear tracking mechanism includes a fulcrum ring. The fulcrum ring is supported by the pressure plate while being axially movable. The fulcrum ring is configured to move the pressing member towards an initial posture side in accordance with a displacement of the moving member.

In the clutch cover assembly, the wear-amount of the friction member is detected by the wear-amount detecting mechanism. In the wear-amount detecting mechanism, the detection member detects the wear-amount of the friction member. When explained in detail, the detection member is engaged with the fulcrum ring and detects the wear-amount of the friction member through the fulcrum ring. Further, the detection member is also engaged with the moving member and is configured to be disengaged from the moving member when the wear-amount detected through the fulcrum ring reaches a predetermined wear-amount. Yet further, the moving member moves when the detection member and the moving member are disengaged from each other. Accordingly, the fulcrum ring is configured to move the pressing member towards the initial posture side in accordance with the displacement of the moving member.

As described above, in the present clutch cover assembly, the wear-amount detecting mechanism is attached to the clutch cover. Therefore, when vibrations are inputted into the clutch cover assembly and the pressure plate is thereby vibrated, the wear-amount detecting mechanism can detect the wear-amount without being directly affected by the vibrations of the pressure plate. Further, the mass of the fulcrum ring is remarkably smaller than that of the pressure plate. Therefore, even when vibrations are inputted into the clutch cover assembly, the magnitude of vibrations to be amplified by the centrifugal force is much smaller in the fulcrum ring than in the pressure plate. With a focus on this point, in the present clutch cover assembly, the wear-amount of the friction member is detected while the detection member of the wear-amount detecting mechanism is engaged with the fulcrum ring. Thus, in the present clutch cover assembly, the wear-amount detecting mechanism can accurately and reliably detect the wear-amount of the friction member. In other words, the present clutch cover assembly can provide accurate wear compensation.

A clutch cover assembly according to a second aspect of the invention relates to the clutch cover assembly recited in the first aspect, wherein the wear-amount detecting mechanism further includes an attachment member for attaching the detection member to the clutch cover. The detection member is pivotably attached to the attachment member. Further, the detection member is engaged with the moving member and is configured to be disengaged from the moving member when a pivot amount, varying in accordance with the wear-amount detected by the detection member, reaches a predetermined value. In the clutch cover assembly, the wear-amount detected by the detection member can be amplified by making the detection member pivot. Accordingly, it is possible to design a part in which the detection member is engaged with the moving member based on the post-amplification wear-amount, i.e., the pivot amount varying in accordance with the wear-amount detected by the detection member. It is thereby possible to enhance flexibility in design.

A clutch cover assembly according to a third aspect of the invention relates to the clutch cover assembly recited in the second aspect, wherein the detection member is pivotably attached to the attachment member. Therefore a distance between a pivot axis of the detection member and a position in which the wear-amount of the friction member is detected is shorter than a distance between the pivot axis of the detection member and a position in which the detection member and the moving member are disengaged from each other. In the present clutch cover assembly, the distance between the pivot axis of the detection member and the position in which the wear-amount of the friction member is detected is set to be shorter than the distance between the pivot axis of the detection member and the position in which the detection member and the moving member are disengaged from each other. Therefore, the wear-amount detected by the detection member can be reliably amplified. Accordingly, it is possible to design a part in which the detection member is engaged with the moving member based on the post-amplification wear-amount, i.e., the pivot amount varying in accordance with the wear-amount detected by the detection member. It is thereby possible to reliably enhance flexibility in design.

A clutch cover assembly according to a fourth aspect of the invention relates to the clutch cover assembly recited in the first aspect, and wherein the wear-amount detecting mechanism further includes a first urging member for causing the detection member to be engaged with the fulcrum ring. In the present clutch cover assembly, the detection member is engaged with the fulcrum ring by the first urging member. Therefore, the detection member can reliably detect the wear-amount of the friction member through the fulcrum ring.

A clutch cover assembly according to a fifth aspect relates to the clutch cover assembly recited in the first aspect, wherein the detection member has: a detection portion for detecting the wear-amount; and a first engaging part to be engaged with the moving member. The moving member has: a second engaging part to be engaged with the first engaging part; and a restriction portion that is engaged with the fulcrum ring and serves to restrict or permit moving of the fulcrum ring. The fulcrum ring has: a wear detection recess with which the detection portion is engaged; and a wear tracking recess with which the restriction portion is engaged.

In the present clutch cover assembly, the detection portion of the detection member detects the wear-amount in the wear detection recess of the fulcrum ring. Further, the restriction portion of the moving member is configured to be moved in the wear tracking recess of the fulcrum ring when the first engaging part of the detection member and the second engaging part of the moving member are disengaged from each other. Thus, more accurate wear compensation can be provided by executing wear detection and wear tracking while the fulcrum ring, the detection member and the moving member are respectively engaged with each other.

A clutch cover assembly according to a sixth aspect of the invention relates to the clutch cover assembly recited in the fifth aspect, wherein the wear-amount detecting mechanism further includes a first urging member for causing the detection member to be engaged with the fulcrum ring. The first engaging part of the detection member is disposed between the first urging member and the second engaging part of the moving member. In the present clutch cover assembly, the first engaging part of the detection member is disposed between the first urging member and the second engaging part of the moving member. Therefore, the first engaging part of the detection member can be reliably engaged with the second engaging part of the moving member by the first urging member. Accordingly, the detection member and the moving member can be less easily disengaged from each other by vibrations or the like.

A clutch cover assembly according to a seventh aspect of the invention relates to the clutch cover assembly recited in the sixth aspect, wherein the wear-amount detecting mechanism further includes an attachment member for attaching the detection member to the clutch cover. The detection member is pivotably attached to the attachment member and a pivot axis of the detection member is provided between the detection member and the first engaging part.

In the present clutch cover assembly, the pivot axis of the detection member is provided between the detection portion of the detection member and the first engaging part of the detection member. Therefore, the pivot direction of the detection portion is set to be opposite to that of the first engaging part of the detection member. In other words, when the fulcrum ring is moved in the direction of the flywheel, the detection portion of the detection member pivots in the direction of the flywheel whereas the first engaging part of the detection member pivots in a direction away from the flywheel. Accordingly, the first engaging part of the detection member and the second engaging part of the moving member can be reliably disengaged from each other by disposing the second engaging part of the moving member between the first engaging part of the detection member and the pressure plate.

A clutch cover assembly according to an eighth aspect of the invention relates to the clutch cover assembly recited in the sixth aspect, wherein the wear-amount detecting mechanism further includes an attachment member for attaching the detection member to the clutch cover. The detection member is pivotably attached to the attachment member and the detection portion is provided between a pivot axis of the detection member and the first engaging part.

In the present clutch cover assembly, the detection portion of the detection member is provided between the pivot axis of the detection member and the first engaging part of the detection member. Therefore, the pivot direction of the detection portion is set to be identical to that of the first engaging part of the detection member. In other words, when the fulcrum ring is moved in the direction of the flywheel, the detection portion of the detection member and the first engaging part of the detection member also pivot in the direction of the flywheel. Accordingly, the first engaging part of the detection member and the second engaging part of the moving member can be reliably disengaged from each other when the first engaging part of the detection member is disposed between the second engaging part of the moving member and the pressure plate.

A clutch cover assembly according to a ninth aspect of the invention relates to the clutch cover assembly recited in the first aspect, wherein the wear-amount detecting mechanism is attached to the clutch cover while being disposed either between the pressure plate and the clutch cover or on the outer side of the clutch cover.

When being attached to the outer side of the clutch cover in the present clutch cover assembly, the wear-amount detecting mechanism can be attached to the clutch cover assembly after the clutch cover assembly is assembled except for the wear-amount detecting mechanism. Further, the wear-amount detecting mechanism can be easily detached from the clutch cover assembly. Accordingly, maintenance and adjustment of the wear-amount detecting mechanism can be easily executed.

When the wear-amount detecting mechanism is herein attached to the outer side of the clutch cover, it is required to form an opening in the clutch cover for allowing the wear-amount detecting mechanism to access the fulcrum ring. However, when the wear-amount detecting mechanism is attached between the pressure plate and the clutch cover, it is not required to form the opening in the clutch cover. Therefore, stiffness of the clutch cover can be enhanced compared to the case that the wear-amount detecting mechanism is attached to the outer side of the clutch cover.

A clutch cover assembly according to a tenth aspect of the invention relates to the clutch cover assembly recited in the first aspect, wherein the wear tracking mechanism further includes slide portions and a second urging member. The slide portions are respectively formed in the pressure plate and the fulcrum ring and slide in contact with each other. The slide portions are formed by slopes slanted along a circumferential direction. The second urging member urges the fulcrum ring in the circumferential direction for rotating the fulcrum ring relatively to the pressure plate. Here, the fulcrum ring is moved in a direction away from the pressure plate when being rotated by the second urging member in accordance with the displacement of the moving member.

In the present clutch cover assembly, the moving member is configured to be moved when the friction member is abraded. Further, the fulcrum ring is rotated relatively to the pressure plate by the second urging member in accordance with the displacement of the moving member. The fulcrum ring and the pressure plate make contact with each other at the slide portions formed by slopes. Therefore, when being rotated relatively to the pressure plate, the fulcrum ring is moved to a side away from the pressure plate. Accordingly, even when the wear-amount is abraded, the position in which the fulcrum ring supports the pressing member is not changed from that of the initial posture. Therefore, a pressure load characteristic, and further, a release load characteristic can be kept in the initial states thereof.

Advantageous Effects of Invention

In the present invention, the wear-amount detecting mechanism is attached to the clutch cover. Therefore, even when vibrations are inputted into the clutch cover assembly and the pressure plate is thereby vibrated, the wear-amount detecting mechanism can detect the wear-amount without being directly affected by the vibrations of the pressure plate. Further, in the present invention, the wear-amount detecting mechanism can accurately and reliably detect the wear-amount of the friction member. Therefore, accurate wear compensation can be provided.

DETAILED DESCRIPTION OF THE PREFERRED EMBODIMENTS

Exemplary Embodiment 1

[Entire Structure]

Figure 1:
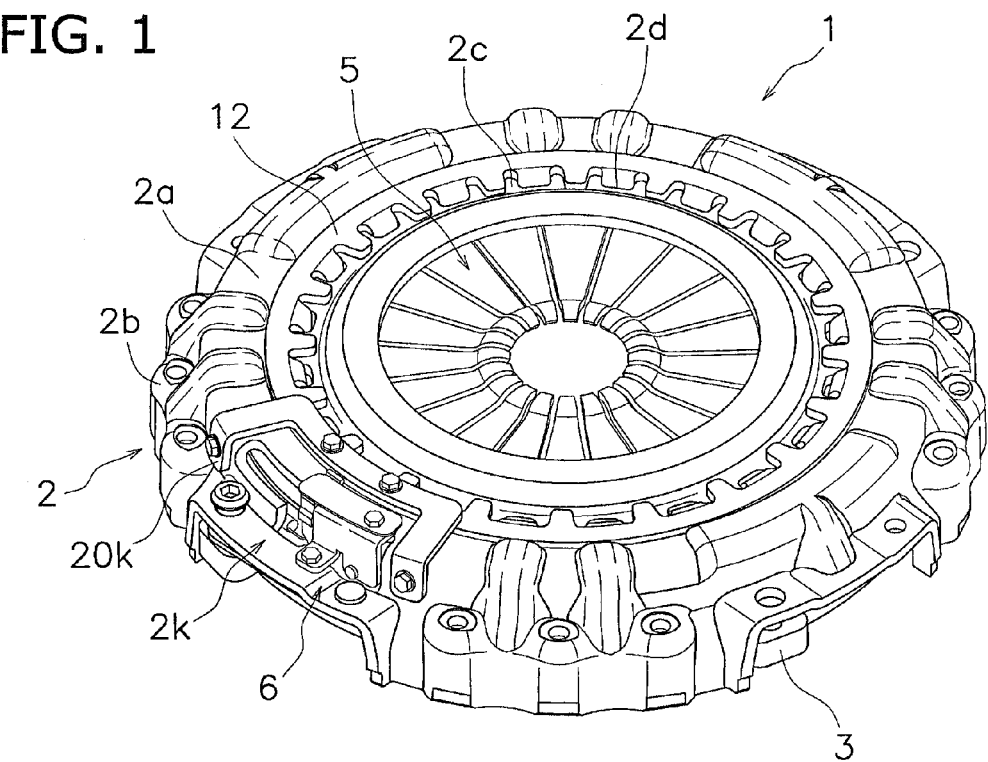
FIG. 1 is an external perspective view of a clutch cover assembly according to a first exemplary embodiment of the present invention.
Figure 2:
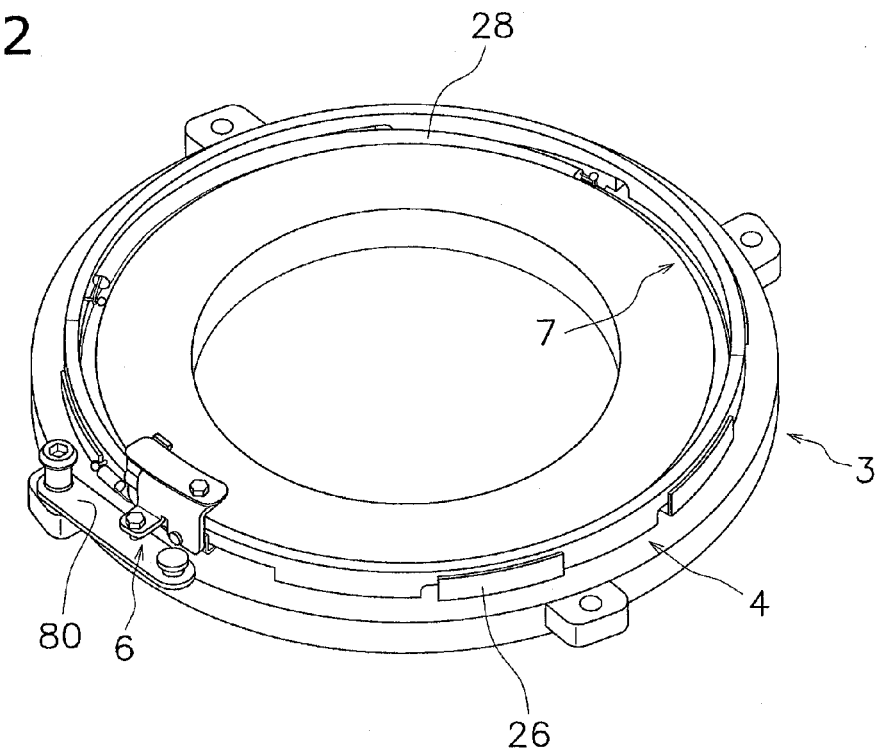
FIG. 2 is an external perspective view of the clutch cover assembly that illustration thereof is partially omitted.

FIG. 1 illustrates an external perspective view of a clutch cover assembly 1 according to a first exemplary embodiment of the present invention. On the other hand, FIG. 2 illustrates an external perspective view of the clutch cover assembly 1 that illustration thereof is partially omitted. The clutch cover assembly 1 is a device for pressing a friction member of the clutch disc assembly onto a flywheel of an engine in a clutch-on (power transmission allowed) state and for releasing the pressing in a clutch-off (power transmission blocked) state. It should be noted that illustration of the flywheel and the clutch disc assembly is herein omitted.

The clutch cover assembly 1 mainly includes a clutch cover 2, a pressure plate 3, a plurality of fulcrum rings 4, a diaphragm spring 5, a wear-amount detecting mechanism 6 and a wear tracking mechanism 7.

[Clutch Cover]

The clutch cover 2 is a roughly saucer-shaped plate member and the outer peripheral part thereof is fixed to the flywheel by, for instance, bolts. The clutch cover 2 has an annular clutch cover main body 2a, a disc-shaped portion 2b disposed on the outer peripheral side and a flat portion 2c disposed on the inner peripheral side. The disc-shaped portion 2b is formed on the outer peripheral side of the clutch cover main body 2a, while being fixed to the outer peripheral part of the flywheel. The flat portion 2c is a flat portion extending radially inwards from the inner peripheral part of the clutch cover main body 2a. A plurality of holes 2d are formed in the flat portion 2c while axially penetrating therethrough.

The clutch cover 2 has an opening 2k for attaching the wear-amount detecting mechanism 6 to be described. Further, the opening 2k is reinforced by a reinforcing member 20k. The reinforcing member 20k is attached to the outer surface of the clutch cover 2. The reinforcing member 20k is formed in a U-shape. Two tips of the reinforcing member 20k are herein attached to the clutch cover 2, while being bent along the outer surface of the clutch cover 2. Further, the middle part of the reinforcing member 20k is attached to a support member 12.

[Pressure Plate]

The pressure plate 3 is an annular member disposed inside the clutch cover main body 2a of the clutch cover 2. A friction surface (not illustrated in the figures), sliding in contact with the friction member of the clutch disc assembly, is formed on the flywheel side (back side in FIG. 6) surface of the pressure plate 3. Further, the pressure plate 3 is coupled to the clutch cover 2 by a plurality of strap plates 80 (see FIG. 2 in which only a single strap plate is illustrated). The strap plates 80 are axially movable with respect to the clutch cover 2, while being circumferentially non-rotatable relatively to the clutch cover 2. It should be noted that in a clutch coupled state, the strap plates 80 are axially deflected and the pressure plate 3 is urged to a side away from the flywheel by the deflection (resilient force) of the strap plates.

Figure 3:
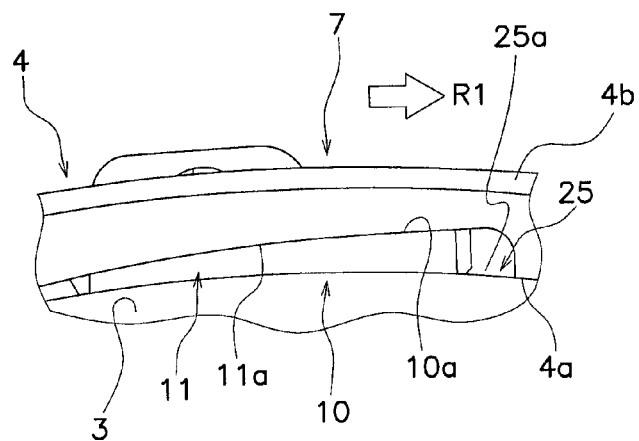
FIG. 3 is a partial enlarged view of a pressure plate and a fulcrum ring.

Further, as illustrated in FIG. 3, slide portions 10 are circumferentially formed at a plurality of positions on the outer peripheral part of the transmission side (front side in FIG. 2) surface of the pressure plate 3. When explained in detail, each slide portion 10 is formed while being protruding axially outwards from a bottom portion 25a of a stepped part 25 (see FIG. 4). Each slide portion 10 has a slope 10a slanted for gradually increasing the height thereof in a first circumferential direction (an R1 direction in FIG. 3). For example, the slant angle of the slope 10a is herein set to be five degrees.

Figure 4:
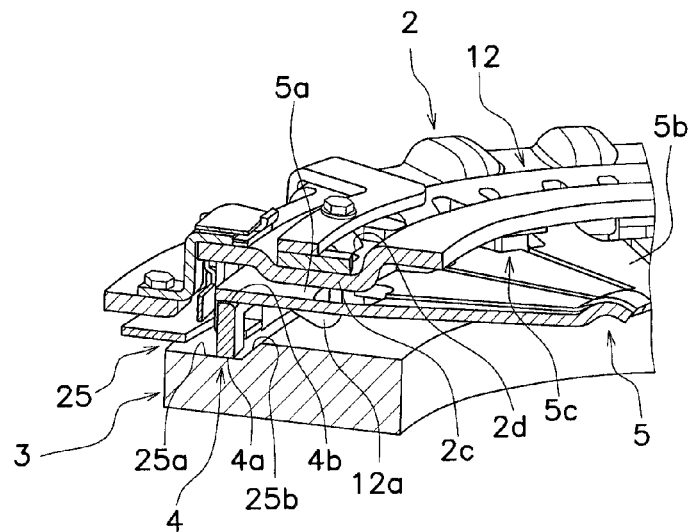
FIG. 4 is a partial cross-sectional perspective view of a support structure of a diaphragm spring.

Further, as illustrated in FIG. 4, the stepped part 25 is circumferentially formed on the outer peripheral part of the transmission side surface of the pressure plate 3. Yet further, guide portions 26 are circumferentially formed at a plurality of positions on the outer peripheral part of the transmission side surface of the pressure plate 3 (see FIG. 2). The guide portions 26 are formed on the pressure plate 3 while being located in positions away from a wall portion 25b of the stepped part 25 at a predetermined interval.

[Fulcrum Rings]

Each of the plural fulcrum rings 4 is a circular-arc member, i.e., one of the members formed by circumferentially dividing an annular member. As illustrated in FIGS. 2 to 4, the plural fulcrum rings 4 are disposed on the pressure plate 3. For example, the plural fulcrum rings 4 are disposed on the pressure plate 3 while being disposed between the wall portion 25b of the stepped part 25 of the pressure plate 3 and the guide portions 26. More specifically, the plural fulcrum rings 4 make contact with the bottom portion 25a of the stepped part 25 of the pressure plate 3 at axially first end 4a side (flywheel side) portions thereof.

Further, as illustrated in FIG. 3, slide portions 11 are circumferentially formed in a plurality of positions on the first ends 4a of the fulcrum rings 4. Each slide portion 11 has a slope 11a. The slope 11a makes contact with the slope 10a of each slide portion 10 formed on the bottom portion 25a of the stepped part 25 of the pressure plate 3. Further, the slope 11a is slanted for gradually reducing the height thereof in the first circumferential direction (the R1 direction in FIG. 3). For example, the slant angle of the slope 11a is herein set to be five degrees.

Figure 5:
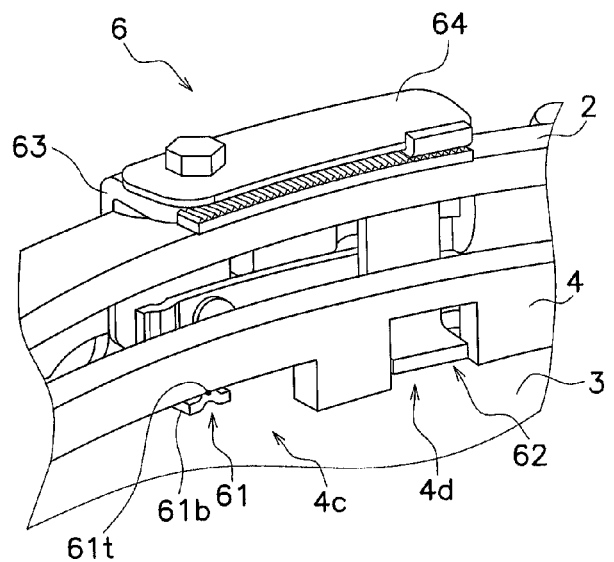
FIG. 5 is an enlarged perspective view of a wear-amount detecting mechanism.

Further, as illustrated in FIG. 5, the fulcrum ring 4 has a recess 4c for wear detection (hereinafter referred to as a first recess) with which a detection portion of a detection member 61 to be described is engaged, and a recess 4d for wear tracking (hereinafter referred to as a second recess) with which a restriction portion 62c of the detection member 61 is engaged. When explained in detail, the first recess 4c and the second recess 4d are portions radially cut out in a grooved shape on the first end 4a side of the fulcrum ring 4. The detection portion 61b of the detection member 61 makes contact with the bottom of the first recess 4c. The restriction portion 62c of the detection member 61 is disposed inside the second recess 4d. The second recess 4d has a width W1 in the circumferential direction (see FIG. 8).

An annular member is herein formed by joining the plural fulcrum rings 4 (circular-arc members). However, a single annular member can be used as the fulcrum ring 4.

[Diaphragm Spring]

The diaphragm spring 5 is a member for pressing the pressure plate 3 towards the flywheel and is supported by the clutch cover 2. As illustrated in FIGS. 1 and 4, the diaphragm spring 5 is a disc-shaped member disposed between the pressure plate 3 and the clutch cover 2. The diaphragm spring 5 is formed by an annular elastic portion 5a and a plurality of lever portions 5b extending radially inwards from the inner peripheral part of the annular elastic portion 5a. The outer peripheral end of the annular elastic portion 5a is supported by second ends 4b of the fulcrum rings 4. Further, slits are formed between adjacent lever portions 5b of the diaphragm spring 5, and oval-shaped holes 5c are formed in the outer peripheral parts of the slits.

It should be noted that a push-type release device (not illustrated in the figures) makes contact with the tips of the lever portions 5b of the diaphragm spring 5. The release device is a device configured to axially move the tips of the lever portions 5b of the diaphragm spring 5 in order to release the urging force acting on the pressure plate 3 from the diaphragm spring 5.

Further, as illustrated in FIG. 4, the diaphragm spring 5 is supported with respect to the clutch cover 2 by the support member 12. The support member 12 is a ring-shaped plate member disposed on the transmission side surface of the flat portion 2c of the clutch cover 2. A plurality of support protrusions 12a are formed on the inner peripheral part of the support member 12, while being extending therefrom radially inwards. The plural support protrusions 12a are bent towards the pressure plate 3 and the bent portions thereof are inserted through the plural through holes 2d formed in the flat portion 2c of the clutch cover 2. Also, the bent portions, inserted through the through holes 2d, are further inserted through the oval-shaped holes 5c of the diaphragm spring 5. Further, the tips of the support protrusions 12a are bent to the outer peripheral side, and thus, support the diaphragm spring 5 with respect to the clutch cover 2.

[Wear-amount Detecting Mechanism]

As illustrated in FIGS. 1, 2, and 5-7, the wear-amount detecting mechanism 6 is attached to the clutch cover 2 while being disposed outside the clutch cover 2. Further, the wear-amount detecting mechanism 6 is disposed on the outer peripheral part of the pressure plate 3. In other words, the wear-amount detecting mechanism 6 is disposed on the outer peripheral side of the fulcrum rings 4.

As illustrated in FIG. 5, the wear-amount detecting mechanism 6 includes the detection member 61, a moving member 62, an attachment member 63, and a first urging member 64. The attachment member 63 is a member for attaching the detection member 61 to the clutch cover 2. As illustrated in FIG. 1, the attachment member 63 is attached to the outer surface of the clutch cover 2 by a bolt.

The detection member 61 is a member for detecting the wear-amount of the friction member. The detection member 61 is configured to detect the wear-amount through the fulcrum ring 4 while being engaged with the fulcrum ring 4. Further, the detection member 61 is engaged with the moving member 62 and is configured to be disengaged from the moving member 62 when the friction member is abraded to a predetermined wear-amount.

Figure 6:
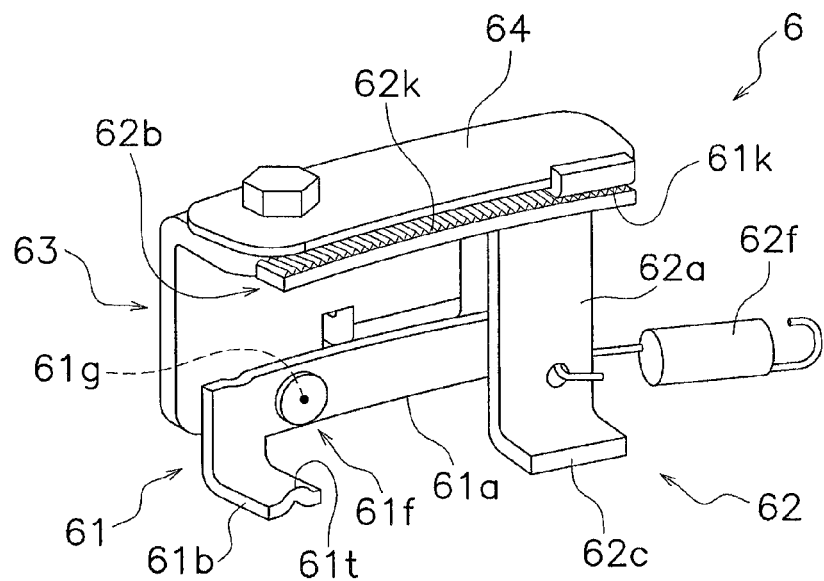
FIG. 6 is a diagram illustrating a structure of the wear-amount detecting mechanism.
Figure 7:
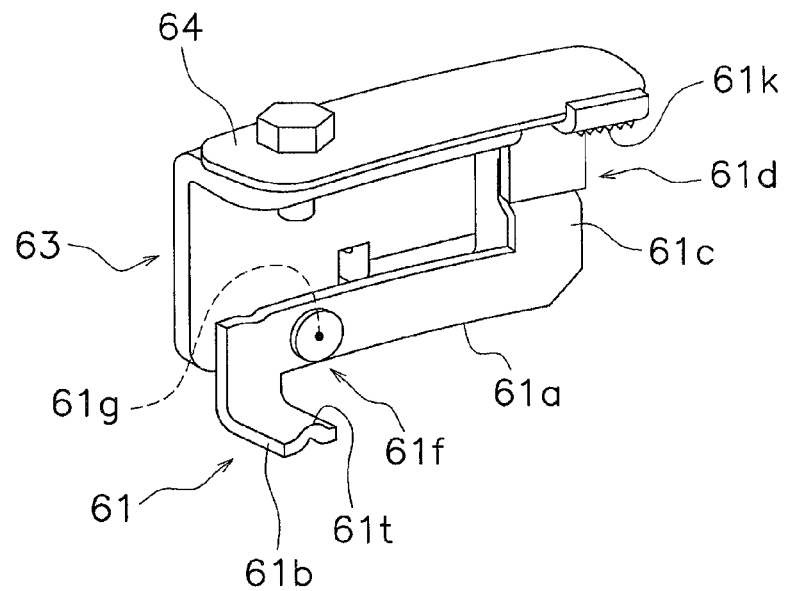
FIG. 7 is a diagram illustrating the structure of the wear-amount detecting mechanism.

Specifically, as illustrated in FIGS. 6 and 7, the detection member 61 is pivotably attached to the attachment member 63. The detection member 61 includes a plate-shaped main body part 61a elongated in one direction, the detection portion 61b protruding from one longitudinal end of the main body part 61a, a protruding portion 61c protruding from the other longitudinal end of the main body part 61a, and a first engaging part 61d attached to the protruding portion 61c.

The main body part 61a has a through hole, and the detection member 61 is pivotably attached to the attachment member 63 by inserting a pin member 61f into the through hole of the main body part 61a and a through hole formed in the attachment member 63. A C-shaped snap ring is attached to the tip of the pin member 61f and restricts the pin member 61f from coming off from the through hole of the attachment member 63. It should be noted that a pivot axis 61g of the detection member 61 is set between the detection portion 61b and the first engaging part 61d. The center of the though hole, i.e., the rotational center of the pin member 61f is herein set as the pivot axis 61g.

Figure 8:
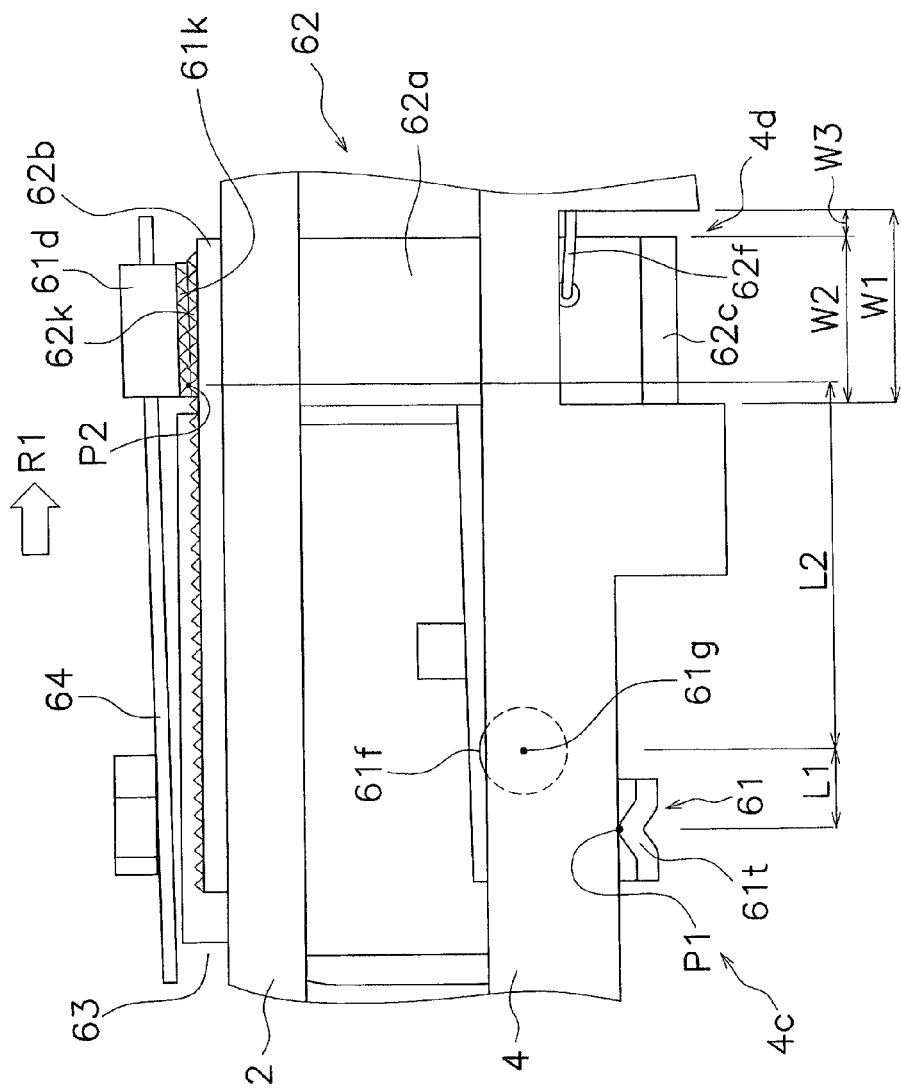
FIG. 8 is a diagram for explaining the structure and an action of the wear-amount detecting mechanism.

The detection portion 61b is a portion for detecting the wear-amount of the friction member. The detection portion 61b is configured to detect the wear-amount of the friction member through the fulcrum ring 4. The detection portion 61b makes contact with the bottom part of the first recess 4c of the fulcrum ring 4 while being disposed between the pressure plate 3 and the first recess 4c of the fulcrum ring 4. More specifically, the detection portion 61b has a cross-section formed in a convex shape and the convex portion makes contact with the bottom part of the first recess 4c of the fulcrum ring 4. As illustrated in FIG. 8, a convex-shaped apex 61t of the detection portion 61b herein makes contact with the bottom part of the first recess 4c of the fulcrum ring 4. A position p1 where the apex 61t of the detection portion 61b makes contact with the bottom part of the first recess 4c of the fulcrum ring 4 is a position for detecting the wear-amount of the friction member.

As illustrated in FIG. 7, the protruding portion 61c is integrally formed with the main body part 61a, and is protruding in a direction away from the pressure plate 3 while the detection member 61 is pivotably attached to the attachment member 63. The first engaging part 61d is attached to the protruding portion 61c.

The first engaging part 61d is a portion to be engaged with the moving member 62. The first engaging part 61d is attached to the protruding portion 61c. Specifically, as illustrated in FIG. 7, the first engaging part 61d has a cross-section formed in an L-shape. A surface of the first engaging part 61d is joined to the protruding portion 61c by welding. Further, the first engaging part 61d is disposed between the moving member 62 and the first urging member 64. Specifically, a part of the first engaging part 61d is disposed between the moving member 62 and the first urging member 64. More specifically, the part of the first engaging part 61d is disposed between a second engaging part 62b (to be described) of the moving member 62 and the first urging member 64.

It should be noted that a case is herein exemplified that the first engaging part 61d is joined to the protruding portion 61c by welding. However, the first engaging part 61d can be joined to the protruding portion 61c by another method. Alternatively, the first engaging part 61d and the protruding portion 61c can be integrally formed.

A convexo-concave portion 61k is formed on the first engaging part 61d. The convexo-concave portion 61k of the first engaging part 61d is formed on a part corresponding to the aforementioned part of the first engaging part 61*d*. The convexo-concave portion 61*k* of the first engaging part 61*d* is engaged with a convexo-concave portion 62*k* (to be described) of the second engaging part 62*b* in the moving member 62. Specifically, the moving member 62 becomes immovable with respect to the pressure plate 3 by causing the convexo-concave portion 61*k* of the first engaging part 61*d* to be meshed with the convexo-concave portion 62*k* of the second engaging part 62*b*. In contrast, the moving member 62 becomes movable with respect to the pressure plate 3 in the rotational direction by causing the convexo-concave portion 61*k* of the first engaging part 61*d* to be unmeshed from the convexo-concave portion 62*k* of the second engaging part 62*b*.

As illustrated in FIG. 8, in the first engaging part 61*d*, a position p2 of the apex of the convex portion closest to the detection portion 61*b* is set as a position for determining the displacement of the first engaging part 61*d*. For example, detection member 61 is disengaged from the moving member 62 when the friction member is abraded to a predetermined wear-amount, in other words, when the displacement of the position p2 of the apex of the convex portion closest to the detection portion 61*b* reaches a predetermined amount. Specifically, the convexo-concave portion 61*k* of the first engaging part 61*d* and the convexo-concave portion 62*k* of the second engaging part 62*b* are disengaged from each other when the first engaging part 61*d* pivots, and further, the position p2 thereof exceeds the height of the convex portions of the convexo-concave portion 62*k* of the second engaging part 62*b*. Accordingly, the moving member 62 becomes movable with respect to the pressure plate 3 in the rotational direction.

The displacement for disengaging the first engaging part 61*d* and the second engaging part 62*b* from each other is herein determined by the height of the convex portions of the convexo-concave portion 61*k* of the first engaging part 61*d* and that of the convex portions of the convexo-concave portion 62*k* of the second engaging part 62*b*. The convexo-concave portions 61*k* and 62*k* are herein formed to have the same setting regarding the shape and size of each convex portion, the shape and size of each concave portion, and intervals of the convex portions and the concave portions. More specifically, the height of the convex portions of the convexo-concave portion 61*k* of the first engaging part 61*d*, i.e., the tooth height is set to be, for instance, 0.6 mm. On the other hand, the height of the convex portions of the convexo-concave portion 62*k* of the second engaging part 62*b*, i.e., the tooth height is set to be, for instance, 0.6 mm.

It should be noted that, when the apexes of the convex portions (the apexes of the teeth) of the convexo-concave portion 61*k* of the first engaging part 61*d* are located in positions opposed to the bottoms of the concave portions (the bottoms of valleys) of the convexo-concave portion 62*k* of the second engaging part 62*b*, this state corresponds to the state that the aforementioned displacement is 0 (zero).

Further, as illustrated in FIG. 8, a first distance L1 between the pivot axis 61*g* of the detection member 61 and the position p1 set for detecting the wear-amount of the friction member is shorter than a second distance L2 between the pivot axis 61*g* of the detection member 61 and the position p2 set for disengaging the detection member 61 and the moving member 62 from each other. In other words, the position of the pin member 61*f*, i.e., the position of the pivot axis 61*g* is set for making the first distance L1 shorter than the second distance L2. Accordingly, the wear-amount detected by the detection portion 61*b* of the detection member 61 is amplified in the first engaging part 61*d* of the detection member 61.

It should be noted that, when explained in detail, the first distance L1 corresponds to a distance between the pivot axis 61*g* of the detection member 61 and the position p1 in which the convex apex 61*t* of the detection portion 61*b* makes contact with the bottom of the first recess 4*c* of the fulcrum ring 4. On the other hand, the second distance L2 corresponds to a distance between the pivot axis 61*g* of the detection member 61 and the position p2 of the apex of the convex portion disposed closest to the detection portion 61*b* in the first engaging part 61*d*.

The moving member 62 is configured to be movable in accordance with the wear-amount of the friction member. As illustrated in FIGS. 6 and 8, the moving member 62 is urged by a first coil spring 62*f* in the first circumferential direction (the R1 direction in FIG. 8). Therefore, where the detection member 61 and the moving member 62 are disengaged from each other, the moving member 62 is moved by the first coil spring 62*f* in the first circumferential direction. In contrast, where the detection member 61 and the moving member 62 are engaged with each other, the moving member 62 is immovable in the circumferential direction.

As illustrated in FIGS. 6 and 8, the moving member 62 has a plate-shaped main body part 62*a* elongated in one direction, the second engaging part 62*b* formed on one longitudinal end of the main body part 62*a*, and the restriction portion 62*c* formed on the other longitudinal end of the main body part 62*a*.

The second engaging part 62*b* is disposed on the outer surface of the clutch cover 2. Further, the second engaging part 62*b* can be engaged with the first engaging part 61*d*. Specifically, the second engaging part 62*b* is formed in a plate shape, and one surface thereof is disposed on the outer surface of the clutch cover 2 whereas the other surface thereof can be engaged with the first engaging part 61*d*. Further, the second engaging part 62*b* is disposed between the clutch cover 2 and the convexo-concave portion 61*k* of the first engaging part 61*d*.

The convexo-concave portion 62*k* is formed on the second engaging part 62*b*. The convexo-concave portion 62*k* of the second engaging part 62*b* is engaged with the convexo-concave portion 61*k* of the first engaging part 61*d* in the detection member 61. Specifically, the convexo-concave portion 62*k* is formed on the above-mentioned other surface of the second engaging part 62*b*. The moving member 62 is immovable with respect to the pressure plate 3 where the convexo-concave portion 62*k* of the second engaging part 62*b* is meshed with the convexo-concave portion 61*k* of the first engaging part 61*d*. In contrast, the moving member 62 is movable with respect to the pressure plate 3 in the first circumferential direction where the convexo-concave portion 61*k* of the first engaging part 61*d* and the convexo-concave portion 62*k* of the second engaging part 62*b* are unmeshed from each other. When the moving member 62 is moved, the above-mentioned one surface of the second engaging part 62*b* is slid on and along the outer surface of the clutch cover 2.

The restriction portion 62*c* is a portion to be engaged with the fulcrum ring 4. When explained in detail, the restriction portion 62*c* is a portion for restricting or permitting the fulcrum ring 4 from moving in the rotational direction. The restriction portion 62*c* is disposed inside the second recess 4*d* of the fulcrum ring 4.

As illustrated in FIG. 8, the restriction portion 62*c* has a width W2 in the circumferential direction. Here, where the restriction portion 62c is disposed in the second recess 4d of the fulcrum ring 4, a difference W3 between the circumferential inter-wall distance W1 in the second recess 4 and the circumferential length W2 of the restriction portion 62c (W3=W1–W2) is set to be a predetermined value (e.g., 1.8 mm). In other words, where the restriction portion 62c makes contact with one wall of the second recess 4d of the fulcrum ring 4, the distance W3 between the other wall of the second recess 4d and the restriction portion 62c is set to be a predetermined value (e.g., 1.8 mm). The rotational amount of the fulcrum ring 4 is determined by the distance W3.

Figure 9:
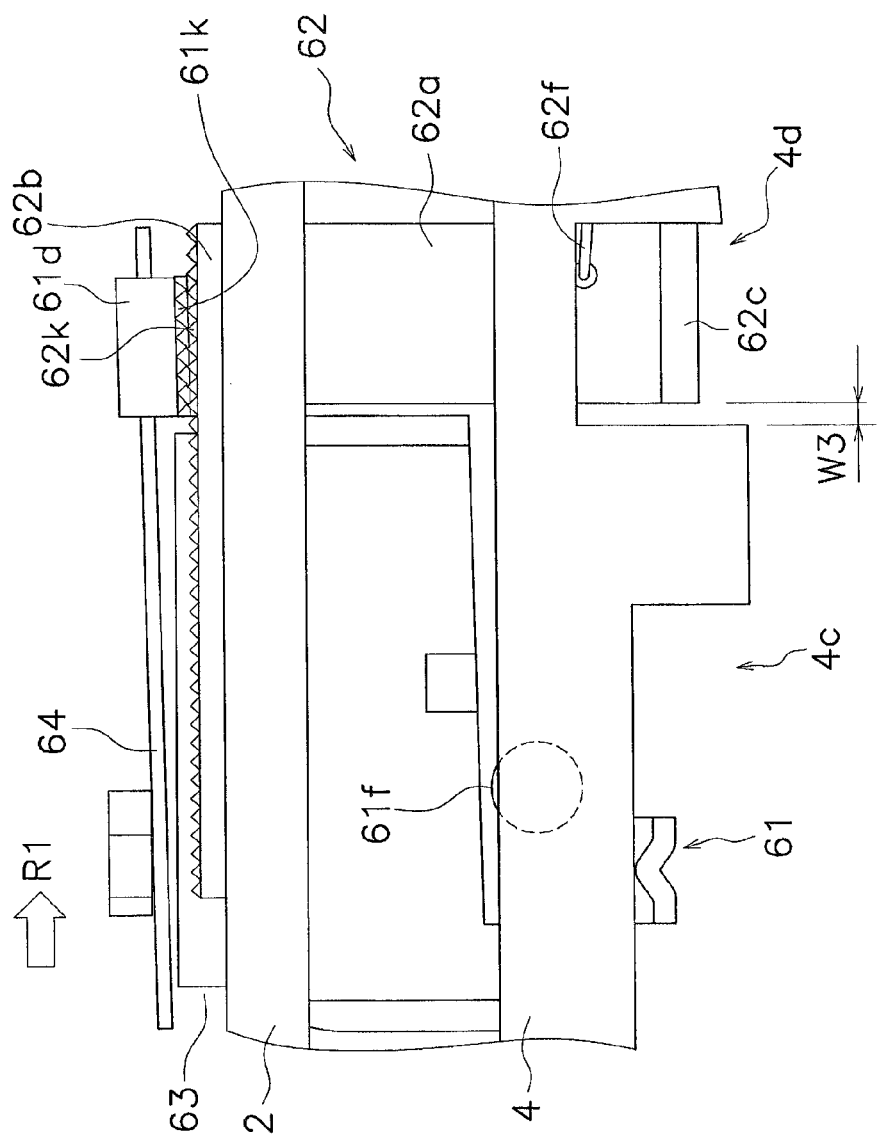
FIG. 9 is a diagram for explaining the structure and the action of the wear-amount detecting mechanism.

The restriction portion 62c is movable within the second recess 4d in the first circumferential direction where the detection member 61 and the moving member 62 are disengaged from each other. Specifically, the restriction portion 62c is urged by the first coil spring 62f in the first circumferential direction. As illustrated in FIG. 9, the restriction portion 62c is movable within the second recess 4d until making contact with the circumferential directional wall of the second recess 4d.

It should be noted that one end of the first coil spring 62f is attached to the moving member 62, while the other end of the first coil spring 62f is attached to the fulcrum ring 4. When explained in detail, one end of the first coil spring 62f is attached to the main body part 62a of the moving member 62.

The first urging member 64 is a member for causing the detection member 61 to be engaged with the fulcrum ring 4. Further, the first urging member 64 is also a member for urging the detection member 61 in the direction of the pressure plate 3.

The first urging member 64 is attached to the attachment member 63. The first urging member 64 is a member with elasticity. For example, a plate spring, a torsion coil spring or the like is used as the first urging member 64. The plate spring is herein used as the first urging member 64. One side of the plate spring 64 is attached to the attachment member 63. Further, as illustrated in FIG. 6, the convexo-concave portion 61k of the first engaging part 61d in the detection member 61 is disposed between the plate spring 64 and the moving member 62. Yet further, the convexo-concave portion 61k of the first engaging part 61d and the second engaging part 62b are disposed between the plate spring 64 and the clutch cover 2.

Here, the first engaging part 61d of the detection member 61 and the second engaging part 62b of the moving member 62 are engaged by the urging force of the plate spring 64. More specifically, the convexo-concave portion 61k of the first engaging part 61d in the detection member 61 and the convexo-concave portion 62k of the second engaging part 62b in the moving member 62 are meshed by the urging force of the plate spring 64.

[Wear Tracking Mechanism]

The wear tracking mechanism 7 is a mechanism for keeping the posture of the diaphragm spring 5 at its initial posture by tracking the wear-amount of the friction member. As illustrated in FIG. 3, in addition to the plural fulcrum rings 4, the wear tracking mechanism 7 includes the slide portions 10 and 11 respectively formed on the aforementioned pressure plate 3 and fulcrum rings 4, and a second urging member 28 (see FIG. 2).

As illustrated in FIGS. 2 and 4, the plural fulcrum rings 4 are rotatable relatively to the pressure plate 3, while being disposed between the wall portion 25b of the stepped part 25 of the pressure plate 3 and the guide portions 26. Further, the plural fulcrum rings 4 are pressed towards the pressure plate 3 by the diaphragm spring 5. Yet further, as illustrated in FIG. 3, the plural fulcrum rings 4 are rotatable in the first circumferential direction (the R1 direction), while the slopes 11a of the slide portions 11 of the respective plural fulcrum rings 4 make contact with the slopes 10a of the slide portions 10 of the pressure plate 3. When herein rotated in the first circumferential direction, the plural fulcrum rings 4 are moved towards the transmission.

The second urging member 28 is a member for urging the fulcrum rings 4 in the first circumferential direction. In other words, the urging member 28 is a member for restricting the fulcrum rings 4 from moving in a second circumferential direction (a direction opposite to the R1 direction; an R2 direction). A coil spring (hereinafter referred to as a second coil spring) is herein used as the second urging member 28.

The second coil spring 28 rotates the fulcrum rings 4 relatively to the pressure plate 3 in the first circumferential direction. As illustrated in FIG. 2, the second coil spring 28 is disposed in a grooved portion formed on the pressure plate 3 while being disposed along the inner peripheral parts of the fulcrum rings 4. The second coil spring 28 is attached to the fulcrum ring 4 and the pressure plate 3. When explained in detail, one end of the second coil spring 28 is attached to the fulcrum ring 4, whereas the other end of the second coil spring 28 is attached to the pressure plate 3.

In the aforementioned structure, when the moving member 62 is moved in the first circumferential direction in accordance with the wear-amount of the friction member, the fulcrum rings 4 are rotatable in the first circumferential direction by the displacement W3 of the moving member 62. When herein rotated with respect to the pressure plate 3, the fulcrum rings 4 are moved in a direction away from the pressure plate 3, i.e., in the axial direction, because the pressure plate 3 and the fulcrum rings 4 make contact with each other at the slopes 10a and 11a formed on the slide portions 10 and 11.

[Action of Wear-amount Detecting Mechanism and Wear Tracking Action]

In the clutch-on (coupled) state, the pressure load of the diaphragm spring 5 acts on the pressure plate 3 through the fulcrum rings 4. Accordingly, the friction member of the clutch disc assembly is interposed and held between the pressure plate 3 and the flywheel. As illustrated in FIG. 5, the detection member 61 is herein engaged with the fulcrum rings 4. Specifically, the detection portion 61b of the detection member 61 makes contact with the bottom of the first recess 4c of the fulcrum ring 4.

When the friction member is abraded, the thickness of the friction member is reduced. Therefore, the pressure plate 3 is moved towards the flywheel (lower side in FIGS. 4 and 8). Further, when the pressure plate 3 is moved, the fulcrum rings 4 disposed on the pressure plate 3 are similarly moved towards the flywheel. Accordingly, the detection member 61 pivots about the pivot axis 61g as a fulcrum. The detection portion 61b of the detection member 61, engaged with the first recess 4c of the fulcrum ring 4, is moved in the moving direction of the fulcrum rings 4 (see FIG. 8). Further, the first engaging part 61d of the detection member 61 is herein moved in a direction opposite to the moving direction of the fulcrum rings 4, i.e., a direction away from the pressure plate 3.

Then, when the displacement of the first engaging part 61d of the detection member 61, i.e., the displacement of the position p2 of the apex of the convex portion located closest to the detection portion 61b becomes greater than or equal to a predetermined value (e.g., 0.6 mm), the first engaging part 61d of the detection member 61 and the second engaging part 62b of the moving member 62 are disengaged from each other. Accordingly, the moving member 62 becomes movable with respect to the pressure plate 3 in the first rotational direction while the restriction portion 62c of the moving member 62 is disposed within the second recess 4d of the fulcrum ring 4. It should be noted that, when the detection member 61 pivots, the first engaging part 61d of the detection member 61 is constantly urged by the plate spring 64 in the direction of the pressure plate 3.

When the detection member 61 and the moving member 62 are subsequently disengaged from each other, as illustrated in FIG. 9, the moving member 62 is moved in the first rotational direction by the urging force of the first coil springs 62f. Accordingly, in conjunction with the moving of the moving member 62, the restriction portion 62c of the moving member 62 is also moved within the second recess 4d of the fulcrum ring 4 in the first rotational direction. Then, the moving member 62 stops moving as illustrated in FIG. 9 when the restriction portion 62c of the moving member 62 makes contact with the wall (the first circumferential directional wall) of the second recess 4d of the fulcrum ring 4. Accordingly, a clearance W3, corresponding to the wear-amount of the friction member, is produced between the second rotation directional wall of the second recess 4d and the restriction portion 62c of the moving member 62.

In the present wear-amount detecting mechanism 6, the fulcrum rings 4 are moved towards the flywheel together with the pressure plate 3 in accordance with the wear-amount of the friction member. When the detection member 61 and the moving member 62 are then disengaged from each other, the moving member 62 is moved by the distance W3 in the first rotational direction. Under the condition, the fulcrum rings 4 are pressed towards the pressure plate 3 by the diaphragm spring 5. Therefore, the fulcrum rings 4 are prevented from rotating and moving. In other words, in the clutch-on (coupled) state, the wear-amount of the friction member is only detected and moving of the fulcrum rings 4 for returning the posture of the diaphragm spring 5 to its initial posture, i.e., wear tracking is not executed.

It should be noted that, even if the detection member 61 pivots, the first engaging part 61d of the detection member 61 and the second engaging part 62b of the moving member 62 cannot be disengaged from each other when the displacement of the first engaging part 61d, i.e., the displacement of the position p2 of the apex of the convex portion located closest to the detection portion 61b is less than a predetermined value. In other words, under the condition, the moving member 62 is immovable with respect to the pressure plate 3 in the first rotational direction.

Further, under the condition, the restriction portion 62c of the moving member 62 is engaged with the second recess 4d of the fulcrum ring 4. Therefore, the fulcrum rings 4 are immovable in the first rotational direction. More specifically, the fulcrum rings 4 are restricted from moving in the first rotational direction by causing the second rotation directional wall of the second recess 4d to make contact with the restriction portion 62c of the moving member 62 set in an immovable state.

Next, when a clutch-off (decoupled) state is produced by executing a clutch releasing operation, pressure of the diaphragm spring 5 onto the fulcrum rings 4 is released. Accordingly, the fulcrum rings 4 are rotated with respect to the pressure plate 3 in the first rotational direction by the second coil spring 28. Rotation of the fulcrum rings 4 is stopped when the wall (the second rotation directional wall) of the second recess 4d of the fulcrum ring 4 makes contact with the restriction portion 62c of the moving member 62.

The pressure plate 3 and the fulcrum rings 4 herein make contact with each other at the respective slide portions 10 and 11 (the slopes 10a and 11a). Therefore, the fulcrum rings 4 are moved in a direction away from the pressure plate 3 when being rotated as described above. In other words, the fulcrum rings 4 are moved towards the transmission by the wear-amount of the friction member. Through the moving, the fulcrum rings 4 are supposed to be returned to their initial positions where the friction member has not been abraded yet. In other words, the posture of the diaphragm spring 5 is returned to its initial posture.

Further, when the fulcrum rings 4 are moved towards the transmission, a clearance can be produced between the detection portion 61b of the detection member 61 and the bottom of the first recess 4c of the fulcrum ring 4. However, in the present exemplary embodiment, the first engaging part 61d of the detection member 61 is constantly urged by the plate spring 64 in the direction of the pressure plate 3. Therefore, even when the fulcrum rings 4 are moved towards the transmission, the detection portion 61b of the detection member 61 is configured to track moving of the fulcrum rings 4 while being abutted to the bottom of the first recess 4c of the fulcrum ring 4 by the urging force of the plate spring 64. Further, at this time, the first engaging part 61d of the detection member 61 is engaged again with the second engaging part 62b of the moving member 62 by the urging force of the plate spring 64. Accordingly, the wear-amount detecting mechanism 6 can be actuated with the aforementioned configuration when the clutch-on (coupled) state is produced again.

It should be noted that the wear-amount of the friction member, i.e., the tracking amount of the fulcrum rings 4 (the displacement of the fulcrum rings 4 towards the transmission) with respect to the wear-amount is determined by the timing of disengaging the first engaging part 61d and the second engaging part 62b from each other, the displacement W3 of the moving member 62 and the slant angles of the slide portions 10 and 11. The timing of disengaging the first engaging part 61d and the second engaging part 62b from each other is determined by the shape and size of each convex portion and the shape and size of each concave portion. Further, the tracking amount of the fulcrum rings 4 with respect to the wear-amount of the friction member is determined by the magnitude of the displacement W3 of the moving member 62 and the slant angles of the slide portions 10 and 11. The wear-amount of the friction member and the tracking amount of the fulcrum rings 4 are herein set to be equal to each other.

Thus, in the present wear tracking mechanism 7, moving of the fulcrum rings 4 is executed when a clutch releasing operation is executed. Specifically, pre-moving preparation for the fulcrum rings 4, i.e., wear detection of the friction member is preliminarily executed in the clutch-on state (a state that the friction member is pressed onto the flywheel). Moving of the fulcrum rings 4, i.e., wear tracking is then executed when the clutch-off state (a state that pressure of the friction member onto the flywheel is released) is produced.

[Features]

(1) In the present clutch cover assembly 1, the wear-amount detecting mechanism 6 is attached to the clutch cover 2. Therefore, even when vibrations are inputted into the clutch cover assembly 1 and the pressure plate 3 is vibrated, the wear-amount detecting mechanism 6 can detect the wear-amount of the friction member without being directly affected by the vibrations of the pressure plate 3.

(2) In the present clutch cover assembly 1, the wear-amount of the friction member is detected while the detection member 61 is engaged with the fulcrum rings 4 that are less affected by vibrations. Therefore, the wear-amount of the friction member can be accurately and reliably detected.

(3) In the present clutch cover assembly 1, the distance (the first distance L1) between the pivot axis 61g of the detection member 61 and the position of detecting the wear-amount of the friction member is shorter than the distance (the second distance L2) between the pivot axis 61g of the detection member 61 and the position of disengaging the detection member 61 and the moving member 62 from each other. Therefore, the wear-amount detected by the detection member 61 (the wear-amount of the friction member) can be amplified. Accordingly, a part in which the detection member 61 is engaged with the moving member 62 can be designed based on the post-amplification wear-amount, i.e., the pivot amount of the detection member 61 that is greater than the wear-amount of the friction member. For example, it is possible to relax accuracy in machining of the convexo-concave portion 61k of the first engaging part 61d and the convexo-concave portion 62k of the second engaging part 62b. Therefore, the first engaging part 61d and the second engaging part 62b can be easily designed. Further, it is possible to enhance flexibility in design of the first engaging part 61d and the second engaging part 62b.

(4) In the present clutch cover assembly 1, the detection portion 61b of the detection member 61 is configured to detect the wear-amount in the first recess 4c (wear detection recess) of the fulcrum ring 4. Further, when the first engaging part 61d of the detection member 61 and the second engaging part 62b of the moving member 62 are disengaged from each other, the restriction portion 62c of the moving member 62 is moved in the second recess 4d (wear tracking recess) of the fulcrum ring 4. Thus, the wear-amount is amplified and wear tracking is executed by causing the fulcrum rings 4, the detection member 61 and the moving member 62 to be respectively engaged with each other. Therefore, more accurate wear compensation can be provided.

(5) In the present clutch cover assembly 1, the first engaging part 61d of the detection member 61 is disposed between the plate spring 64 (first urging member) and the second engaging part 62b of the moving member 62. Therefore, the first engaging part 61d of the detection member 61 can be reliably engaged with the second engaging part 62b of the moving member 62 by the plate spring 64. Accordingly, the detection member 61 and the moving member 62 can be prevented from being easily disengaged from each other by vibrations or the like.

(6) In the present clutch cover assembly 1, the pivot axis 61g of the detection member 61 is disposed between the detection portion 61b of the detection member 61 and the first engaging part 61d of the detection member 61. Therefore, the pivot direction of the detection portion 61b is set to be opposite to that of the first engaging part 61d of the detection member 61. In other words, when the fulcrum rings 4 are moved in the direction of the flywheel, the detection portion 61b of the detection member 61 pivots in the flywheel direction and the first engaging part 61d of the detection member 61 pivots in a direction away from the flywheel. Therefore, when the second engaging part 62b of the moving member 62 is disposed between the first engaging part 61d of the detection member 61 and the pressure plate 3, the first engaging part 61d of the detection member 61 and the second engaging part 62b of the moving member 62 can be reliably disengaged from each other.

(7) In the present clutch cover assembly 1, the wear-amount detecting mechanism 6 is attached to the outer side of the clutch cover. Therefore, in assembling the clutch cover assembly 1 except for the wear-amount detecting mechanism 6, the wear-amount detecting mechanism 6 can be subsequently attached thereto. Further, the wear-amount detecting mechanism 6 can be easily detached from the clutch cover assembly 1. Accordingly, maintenance and adjustment of the wear-amount detecting mechanism 6 can be easily executed.

Exemplary Embodiment 2

The basic element structures of the clutch cover assembly 1 according to a second exemplary embodiment of the present invention are similar to but mainly different from those according to the first exemplary embodiment regarding the structure of a wear-amount detecting mechanism 106. Therefore, the same structures as those of the first exemplary embodiment will be simply explained without being explained in detail. In other words, structures that explanation thereof is herein omitted are equivalent to those of the first exemplary embodiment. Further, in figures used in the second exemplary embodiment, the same reference numerals are assigned to elements identical to those of the first exemplary embodiment. It should be noted that the second exemplary embodiment can be explained using the figures of the aforementioned exemplary embodiment.

[Entire Structure]

Figure 10:
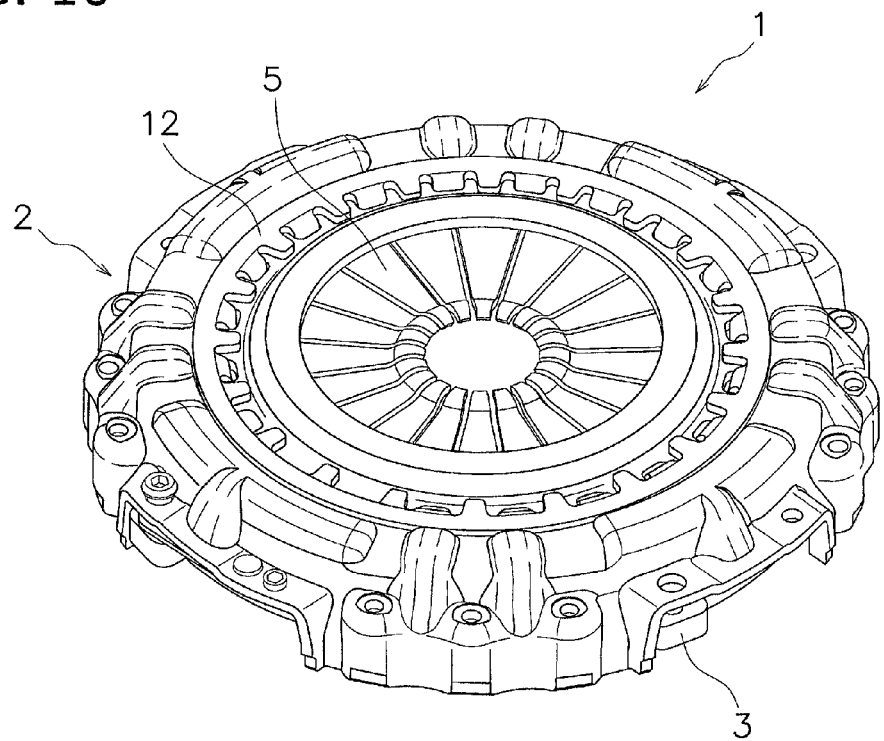
FIG. 10 is an external perspective view of a clutch cover assembly according to a second exemplary embodiment and a third exemplary embodiment of the present invention.

FIG. 10 illustrates an external perspective view of the clutch cover assembly 1 according to the second exemplary embodiment of the present invention. The clutch cover assembly 1 is a device for pressing the friction member of the clutch disc assembly onto the flywheel of the engine in a clutch-on (power transmission allowed) state and for releasing the pressing in a clutch-off (power transmission blocked) state. It should be noted that illustration of the flywheel and the clutch disc assembly is herein omitted.

Figure 11:
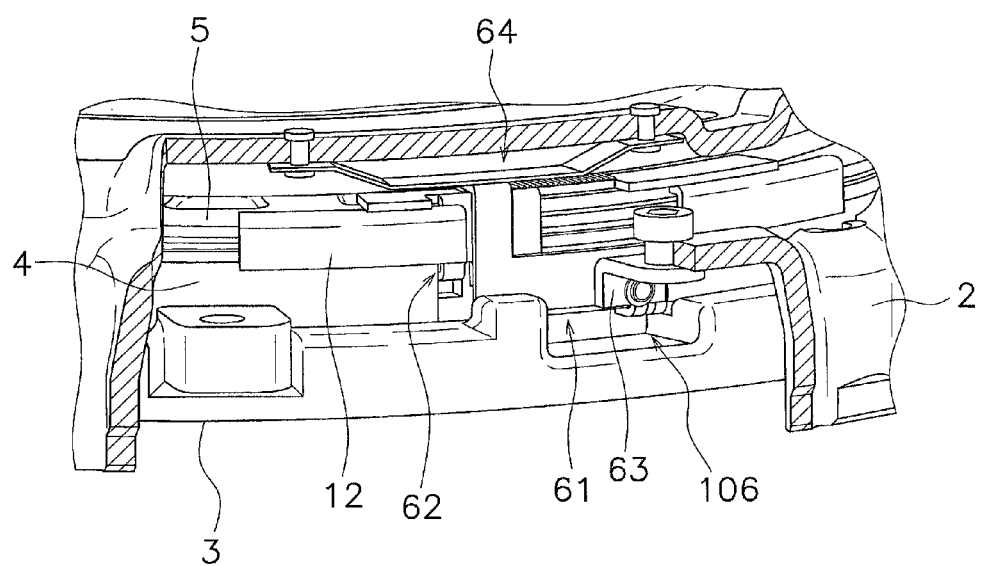
FIG. 11 is an enlarged perspective view of a wear-amount detecting mechanism (the second exemplary embodiment).

As illustrated in FIGS. 10 and 11, the clutch cover assembly 1 mainly includes the clutch cover 2, the pressure plate 3, the plural fulcrum rings 4, the diaphragm spring 5, the wear-amount detecting mechanism 106 and the wear tracking mechanism 7.

[Clutch Cover]

The clutch cover 2 is a roughly saucer-shaped plate member and the outer peripheral part thereof is fixed to the flywheel by, for instance, bolts.

[Pressure Plate]

Figure 12:
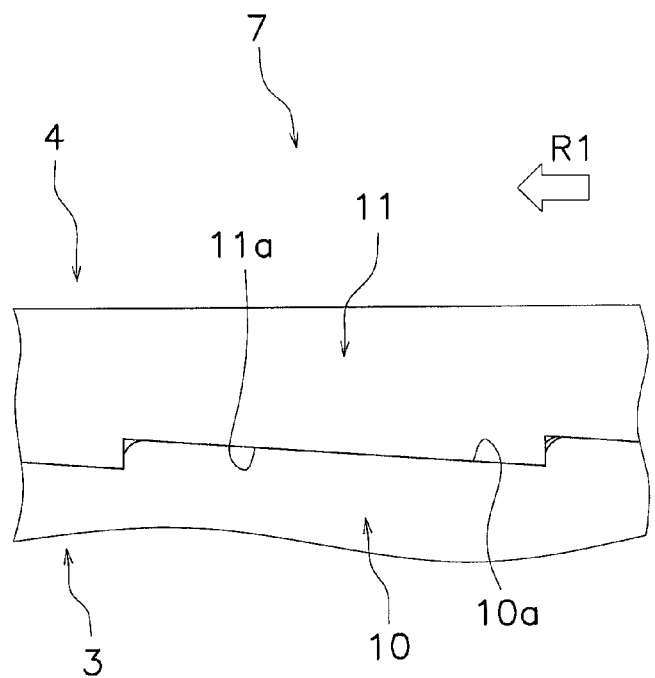
FIG. 12 is a partial enlarged view of a pressure plate and a fulcrum ring (the second exemplary embodiment and the third exemplary embodiment).

The pressure plate 3 is an annular member disposed inside the clutch cover main body 2a of the clutch cover 2. Further, as illustrated in FIG. 12, the plural slide portions 10 are circumferentially formed on the outer peripheral part of the transmission side surface of the pressure plate 3. When explained in detail, each slide portion 10 is formed while being protruding axially outwards from the pressure plate 3. Each slide portion 10 has the slope 10a slanted for gradually increasing the height thereof in the first circumferential direction (an R1 direction in FIG. 12). For example, the slant angle of the slope 10a is herein set to be five degrees.

[Fulcrum Rings]

Each of the plural fulcrum rings 4 is a circular-arc member, i.e., one of the members formed by circumferentially dividing an annular member. As illustrated in FIGS. 11 and 12, the plural fulcrum rings 4 are disposed on the pressure plate 3.

Further, as illustrated in FIG. 12, the plural slide portions 11 are circumferentially formed on the fulcrum rings 4. Each slide portion 11 has the slope 11a. The slope 11a makes contact with the slope 10a of each slide portion 10 formed on the pressure plate 3, while being slanted for gradually reducing the height thereof in the first circumferential direction (the R1 direction in FIG. 12). For example, the slant angle of the slope 11a is herein set to be five degrees.

Figure 16:
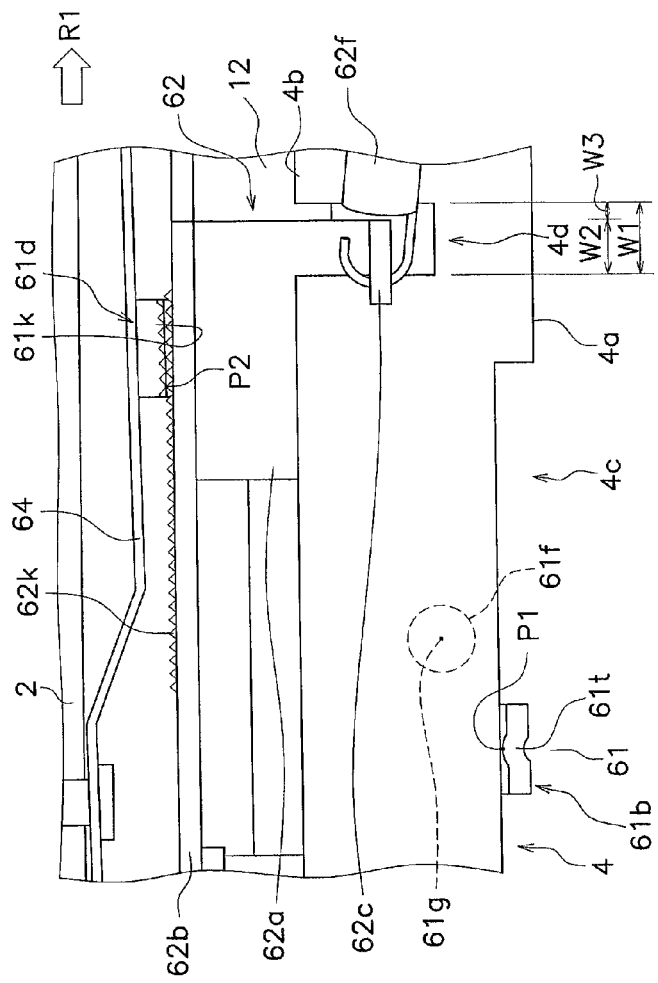
FIG. 16 is a diagram for explaining the structure and an action of the wear-amount detecting mechanism (the second exemplary embodiment).

Further, as illustrated in FIG. 16, the fulcrum ring 4 has a recess 4c for wear detection (hereinafter referred to as a first recess) with which the detection part 61b of the detection member 61 to be described is engaged, and a recess 4d for wear tracking (hereinafter referred to as a second recess) with which the restricting portion 62c of the detection member 62 is engaged. The second recess 4d is a portion formed by radially cutting out the second end 4b of the fulcrum ring 4 in a grooved shape. The second recess 4d has the width W1 in the circumferential direction.

[Diaphragm Spring]

The diaphragm spring 5 is a member for pressing the pressure plate 3 towards the flywheel and is supported by the clutch cover 2. As illustrated in FIGS. 10 and 11, the diaphragm spring 5 is disposed between the pressure plate 3 and the clutch cover 2. Further, as illustrated in FIG. 10, the diaphragm spring 5 is supported with respect to the clutch cover 2 by the support member 12.

[Wear-amount Detecting Mechanism]

As illustrated in FIGS. 11 and 13 to 16, the wear-amount detecting mechanism 106 is disposed on the outer peripheral part of the pressure plate 3. In other words, the wear-amount detecting mechanism 106 is disposed on the outer peripheral side of the fulcrum rings 4. Further, the wear-amount detecting mechanism 106 is attached to the clutch cover 2 while being disposed inside the clutch cover 2. More specifically, the wear-amount detecting mechanism 106 is attached to the clutch cover 2 while being disposed between the pressure plate 3 and the clutch cover 2 (see FIG. 11).

The wear-amount detecting mechanism 106 includes the detection member 61, the moving member 62, the attachment member 63 and the first urging member 64. The attachment member 63 is attached to the inner surface of the clutch cover 2 by a bolt (see FIG. 11).

The detection member 61 is a member for detecting the wear-amount of the friction member. The detection member 61 is configured to detect the wear-amount through the fulcrum ring 4 while being engaged with the fulcrum ring 4. Further, the detection member 61 is engaged with the moving member 62 and is configured to be disengaged from the moving member 62 when the friction member is abraded to a predetermined wear-amount.

Figure 14:
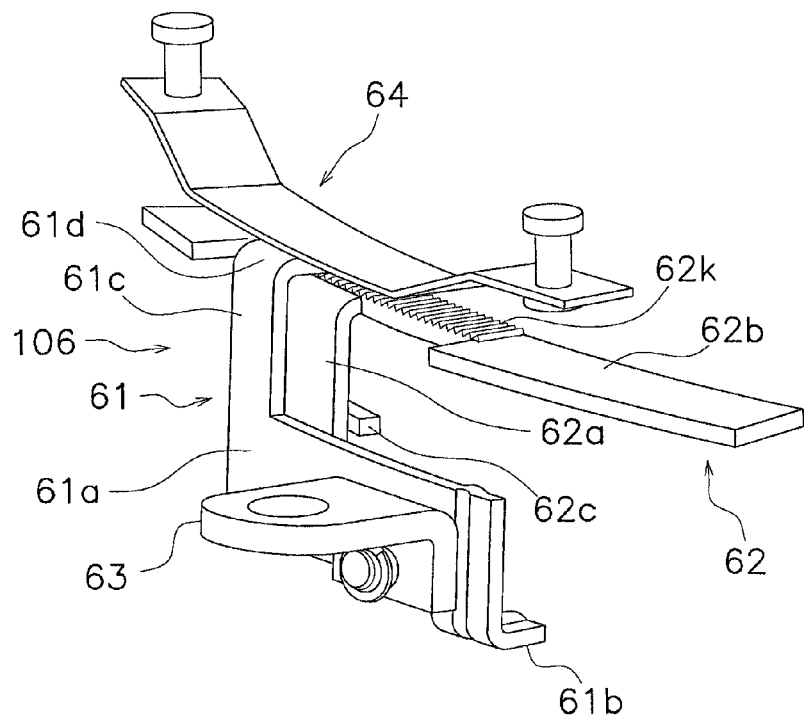
FIG. 14 is a diagram illustrating a structure of the wear-amount detecting mechanism (the second exemplary embodiment).
Figure 15:
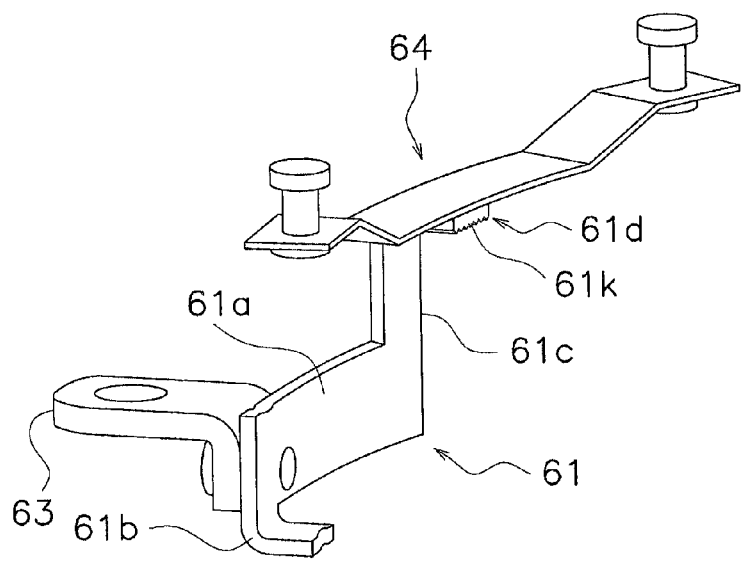
FIG. 15 is a diagram illustrating the structure of the wear-amount detecting mechanism (the second exemplary embodiment).

Specifically, as illustrated in FIGS. 11, 14 and 15, the detection member 61 is pivotably attached to the attachment member 63. The detection member 61 includes the plate-shaped main body part 61a elongated in one direction, the detection portion 61b protruding from one longitudinal end of the main body part 61a, the protruding portion 61c protruding from the other longitudinal end of the main body part 61a, and the first engaging part 61d integrally formed with the protruding portion 61c.

The displacement for disengaging the first engaging part 61d and the second engaging part 62b from each other is herein determined by the height of the convex portions of the convexo-concave portion 61k of the first engaging part 61d and that of the convex portions of the convexo-concave portion 62k of the second engaging part 62b. The height of the convex portions of the convexo-concave portion 61k of the first engaging part 61d, i.e., the tooth height is herein set to be, for instance, 0.6 mm. On the other hand, the height of the convex portion of the convexo-concave portion 62k of the second engaging part 62b, i.e., the tooth height is set to be, for instance, 0.6 mm.

The moving member 62 is configured to be movable in accordance with the wear-amount. Specifically, as illustrated in FIGS. 13 and 16, the moving member 62 is urged by the first coil spring 62f in the first circumferential direction (the R1 direction in FIG. 16) and is thus configured to be movable in accordance with the wear-amount.

Figure 13:
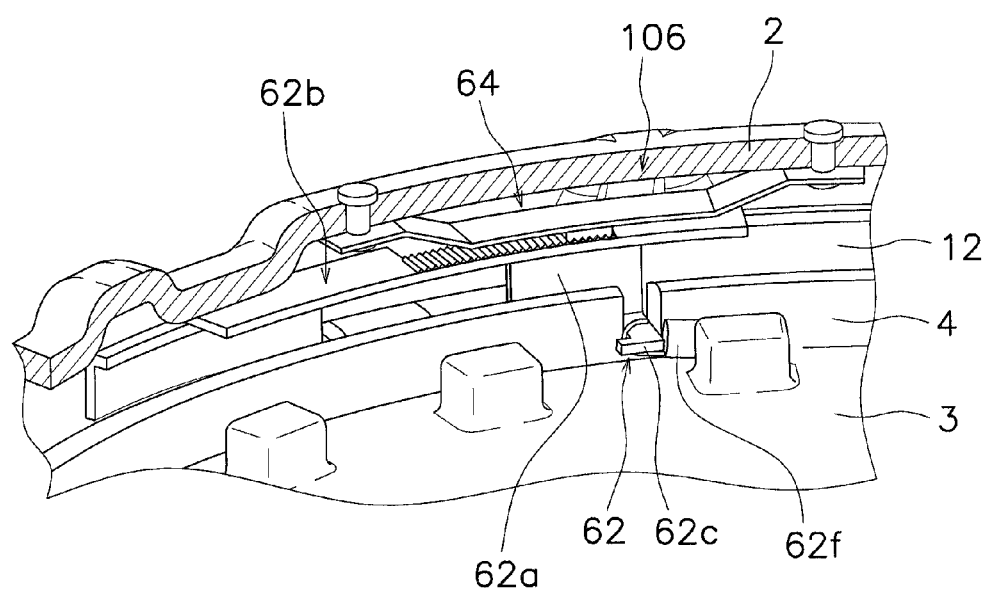
FIG. 13 is an enlarged perspective view of the wear-amount detecting mechanism (the second exemplary embodiment).

Specifically, as illustrated in FIGS. 13 and 14, the moving member 62 has the plate-shaped main body part 62a, the second engaging part 62b formed on one end of the main body part 62a, and the restriction portion 62c formed on the other end of the main body part 62a.

The second engaging part 62b is disposed between the clutch cover 2 and the support member 12. The second engaging part 62b is slidably disposed on the outer surface of the support member 12. Specifically, the second engaging part 62b is formed in a plate shape, and one surface thereof is disposed on the outer surface of the support member 12 whereas the outer surface thereof can be engaged with the first engaging part 61d.

The restriction portion 62c is a portion to be engaged with the fulcrum ring 4. As illustrated in FIG. 16, the restriction portion 62c (a portion disposed inside the second recess 4d) has the width W2 in the circumferential direction. Here, where the restriction portion 62c is disposed in the second recess 4d of the fulcrum ring 4, the difference W3 between the circumferential inter-wall distance W1 in the second recess 4d and the circumferential length W2 of the restriction portion 62c (W3=W1−W2) is set to be a predetermined value (e.g., 1.8 mm). In other words, where the restriction portion 62c makes contact with one wall of the second recess 4d of the fulcrum ring 4, the distance W3 between the other wall of the second recess 4d and the restriction portion 62c is set to be a predetermined value (e.g., 1.8 mm). The amount of rotational moving of the fulcrum ring 4 (the rotation amount of the fulcrum ring 4) is determined by the distance W3.

The first urging member 64 is a member for causing the detection member 61 to be engaged with the fulcrum ring 4. Further, the first urging member 64 is also a member for urging the detection member 61 in the direction of the pressure plate 3.

The first urging member 64 is attached to the inner surface of the clutch cover 2. The first urging member 64 is a member with elasticity. For example, a plate spring, a torsion coil spring or the like. is used as the first urging member 64. The plate spring is herein used as the first urging member 64. The plate spring 64 is attached at its both ends to the clutch cover 2. The convexo-concave portion 61k of the first engaging part 61d in the detection member 61 is disposed on the center part of the plate spring 64. Further, the convexo-concave portion 61k of the first engaging part 61d and the second engaging part 62b are disposed between the plate spring 64 and the support member 12.

The first engaging part 61d of the detection member 61 and the second engaging part 62b of the moving member 62 are engaged by the urging force of the plate spring 64. Specifically, the convexo-concave portion 61k of the first engaging part 61d in the detection member 61 and the convexo-concave portion 62k of the second engaging part 62b in the moving member 62 are meshed by the urging force of the plate spring 64.

[Wear Tracking Mechanism]

The wear tracking mechanism 7 is a mechanism for keeping the posture of the diaphragm spring 5 at its initial posture by tracking the wear-amount of the friction member. As illustrated in FIG. 12, in addition to the plural fulcrum rings 4, the wear tracking mechanism 7 includes the slide portions 10 and 11 respectively formed on the aforementioned pressure plate 3 and the fulcrum rings 4 and the second urging member 28.

In the structure as described above, when the moving member 62 is moved in the first circumferential direction in accordance with the wear-amount of the friction member, the fulcrum rings 4 are rotatable in the first circumferential direction by the displacement of the moving member 62. When the fulcrum rings 4 are herein rotated in the first circumferential direction, the fulcrum rings 4 are moved towards the transmission because the both members 3 and 4 make contact with each other at the slopes 10a and 11a of the slide portions 10 and 11 thereof.

[Action of Wear-amount Detecting Mechanism and Wear Tracking Action]

In the second exemplary embodiment having the structure as described above, an action of the wear-amount detecting mechanism 106 and a wear tracking action are the same as those of the first exemplary embodiment. Therefore, explain thereof will be hereinafter omitted.

[Features]

(1) In the present clutch cover assembly 1, the wear-amount detecting mechanism 106 is attached to the inner side of the clutch cover 2. Therefore, it is not required to form an opening in the clutch cover for allowing the wear-amount detecting mechanism 106 to access the fulcrum rings 4. Therefore, stiffness of the clutch cover 2 can be further enhanced than the case that the wear-amount detecting mechanism 106 is attached to the outer side of the clutch cover 2.

(2) In the present clutch cover assembly 1, the plate spring 64 (first urging member) is supported at the both ends thereof. Therefore, the first engaging part 61d of the detection member 61 can be reliably engaged with the second engaging part 62b of the moving member 62. Accordingly, the detection member 61 and the moving member 62 can be prevented from being easily disengaged from each other due to vibrations or the like.

(3) The present clutch cover assembly 1 can also achieve advantageous effects similarly to those achieved by the first exemplary embodiment.

Exemplary Embodiment 3

The basic element structures of the clutch cover assembly 1 according to a third exemplary embodiment of the present invention are similar to but mainly different from those according to the aforementioned exemplary embodiments regarding the structure of a wear-amount detecting mechanism 206. Therefore, the same structures as those of the aforementioned exemplary embodiments will be simply explained without being explained in detail. In other words, structures that explanation thereof is herein omitted are equivalent to those of the aforementioned exemplary embodiments. Further, in figures used in the third exemplary embodiment, the same reference numerals are assigned to elements identical to those of the aforementioned exemplary embodiments. It should be noted that the third exemplary embodiment can be explained using the figures of the aforementioned exemplary embodiments.

[Entire Structure]

An external perspective view of the clutch cover assembly 1 according to the third exemplary embodiment of the present invention is the same as that of the second exemplary embodiment illustrated in FIG. 10. The clutch cover assembly 1 is a device for pressing the friction member of the clutch disc assembly onto the flywheel of the engine in a clutch-on (power transmission allowed) state and for releasing the pressing in a clutch-off (power transmission blocked) state. It should be noted that illustration of the flywheel and the clutch disc assembly is herein omitted.

Figure 17:
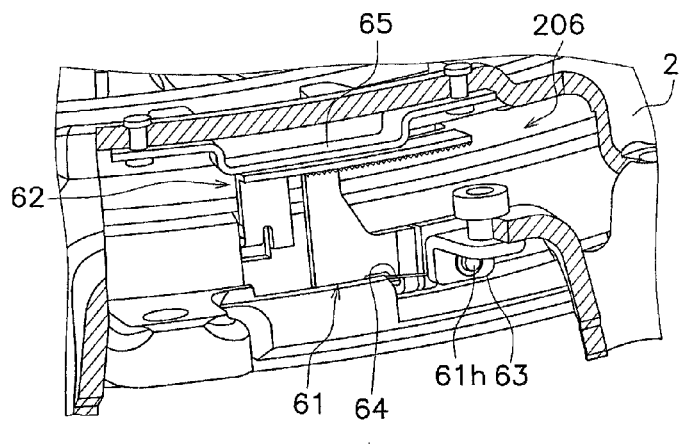
FIG. 17 is an enlarged perspective view of a wear-amount detecting mechanism (the third exemplary embodiment).

As illustrated in FIGS. 10 and 17, the clutch cover assembly 1 mainly includes the clutch cover 2, the pressure plate 3, the plural fulcrum rings 4, the diaphragm spring 5, the wear-amount detecting mechanism 206 and the wear tracking mechanism 7.

[Clutch Cover]

The clutch cover 2 is a roughly saucer-shaped plate member and the outer peripheral part thereof is fixed to the flywheel by, for instance, bolts.

[Pressure Plate]

The pressure plate 3 is an annular member disposed inside the clutch cover main body 2a of the clutch cover 2. Further, as illustrated in FIG. 12, the plural slide portions 10 are circumferentially formed on the outer peripheral part of the transmission side surface of the pressure plate 3. When explained in detail, each slide portion 10 is formed while being protruding axially outwards from the pressure plate 3. Each slide portion 10 has the slope 10a slanted for gradually increasing the height thereof in the first circumferential direction (the R1 direction in FIG. 12). For example, the slant angle of the slope 10a is herein set to be five degrees.

[Fulcrum Rings]

Each of the plural fulcrum rings 4 is a circular-arc member, i.e., one of the members formed by circumferentially dividing an annular member. As illustrated in FIGS. 12 and 17, the plural fulcrum rings 4 are disposed on the pressure plate 3.

Further, as illustrated in FIG. 12, the plural slide portions 11 are circumferentially formed on the fulcrum rings 4. Each slide portion 11 has the slope 11a. The slope 11a makes contact with the slope 10a of each slide portion 10 formed on the pressure plate 3, while being slanted for gradually reducing the height thereof in the first circumferential direction (the R1 direction in FIG. 12). For example, the slant angle of the slope 11a is herein set to be five degrees.

Figure 21:
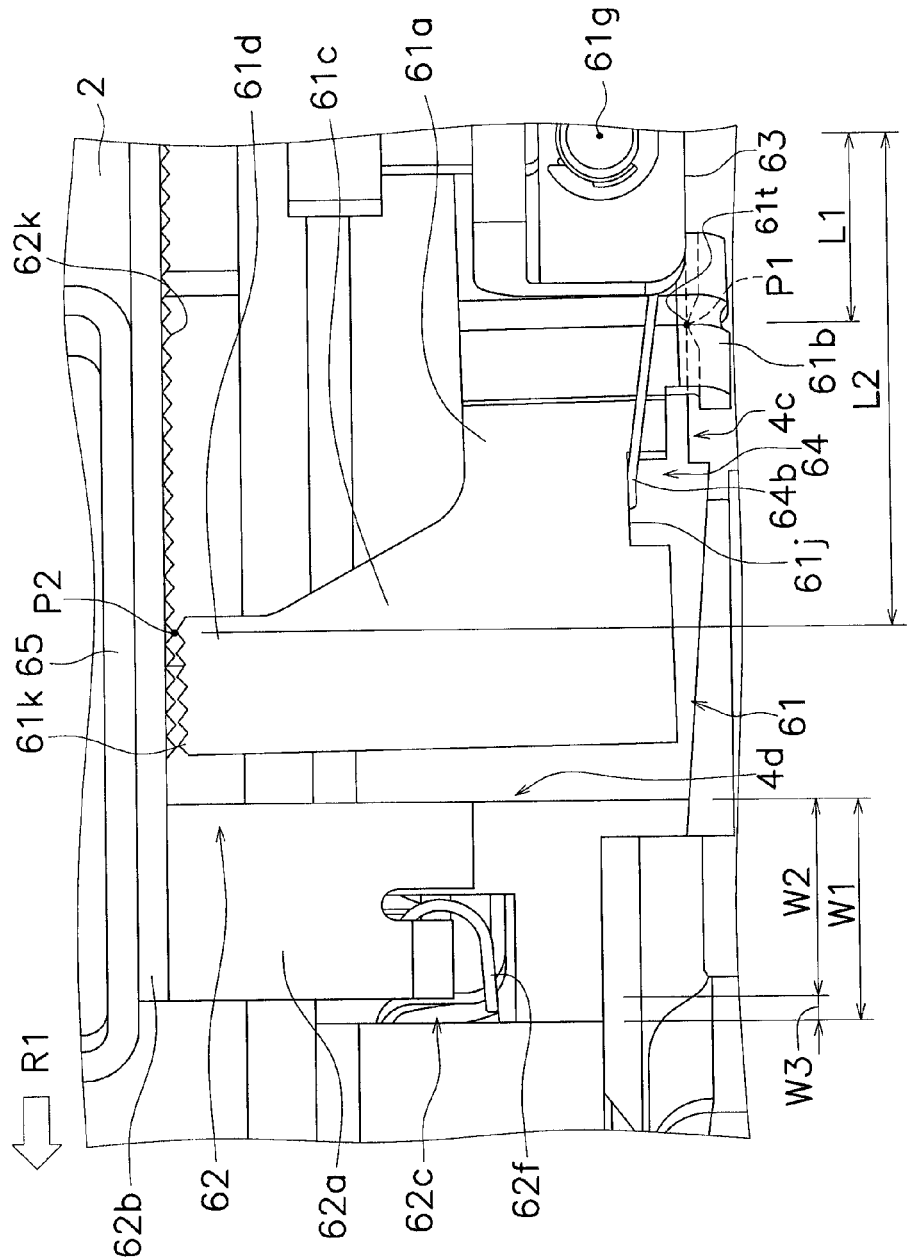
FIG. 21 is a diagram for explaining the structure and an action of the wear-amount detecting mechanism (the third exemplary embodiment).

Further, as illustrated in FIG. 21, the fulcrum ring 4 has the recess 4c for wear detection (hereinafter referred to as a first recess) with which the detection part 61b of the detection member 61 to be described is engaged, and the recess 4d for wear tracking (hereinafter referred to as a second recess) with which the restricting portion 62c of the detection member 62 is engaged. The second recess 4d is a portion formed by axially cutting out the second end 4b of the fulcrum ring 4 in a grooved shape. Further, a part of the bottom of the second recess 4d is radially cut out in a grooved shape. The second recess 4d has the width W1 in the circumferential direction.

[Diaphragm Spring]

The diaphragm spring 5 is a member for pressing the pressure plate 3 towards the flywheel and is supported by the clutch cover 2. As illustrated in FIGS. 10 and 17, the diaphragm spring 5 is disposed between the pressure plate 3 and the clutch cover 2. Further, as illustrated in FIG. 10, the diaphragm spring 5 is supported with respect to the clutch cover 2 by the support member 12.

[Wear-amount Detecting Mechanism]

As illustrated in FIGS. 17 and 21, the wear-amount detecting mechanism 206 is disposed on the outer peripheral part of the pressure plate 3. In other words, the wear-amount detecting mechanism 206 is disposed on the outer peripheral side of the fulcrum rings 4. Further, the wear-amount detecting mechanism 206 is attached to the clutch cover 2 while being disposed inside the clutch cover 2. More specifically, the wear-amount detecting mechanism 206 is attached to the clutch cover 2 while being disposed between the pressure plate 3 and the clutch cover 2 (see FIG. 17).

The wear-amount detecting mechanism 206 includes the detection member 61, the moving member 62, the attachment member 63, the first urging member 64 and a positioning member 65. As illustrated in FIG. 17, the attachment member 63 is attached to the inner surface of the clutch cover 2 by a bolt. Further, the positioning member 65 is attached to the inner surface of the clutch cover 2 using pin members.

The detection member 61 is a member for detecting the wear-amount of the friction member. The detection member 61 is configured to detect the wear-amount through the fulcrum ring 4 while being engaged with the fulcrum ring 4. Further, the detection member 61 is engaged with the moving member 62 and is configured to be disengaged from the moving member 62 when the friction member is abraded to a predetermined wear-amount.

Figure 19:
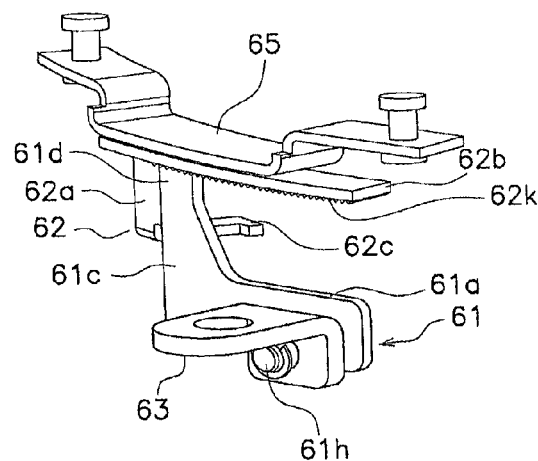
FIG. 19 is a diagram illustrating a structure of the wear-amount detecting mechanism (the third exemplary embodiment).
Figure 20:
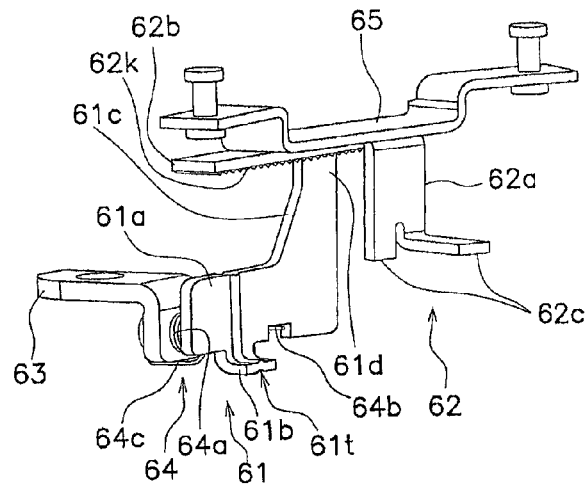
FIG. 20 is a diagram illustrating the structure of the wear-amount detecting mechanism (the third exemplary embodiment).

Specifically, as illustrated in FIGS. 19 to 21, the detection member 61 is pivotably attached to the attachment member 63. The detection member 61 includes the plate-shaped main body part 61*a* elongated in one direction, the detection portion 61*b* protruding from the longitudinal intermediate part of the main body part 61*a*, the protruding portion 61*c* protruding from one end of the main body part 61*a*, and the first engaging part 61*d* integrally formed with the protruding portion 61*c*.

The displacement for disengaging the first engaging part 61*d* and the second engaging part 62*b* from each other is herein determined by the height of the convex portion of the convexo-concave portion 61*k* of the first engaging part 61*d* and that of the convex portion of the convexo-concave portion 62*k* of the second engaging part 62*b*. The height of the convex portion of the convexo-concave portion 61*k* of the first engaging part 61*d*, i.e., the tooth height is herein set to be, for instance, 0.6 mm. On the other hand, the height of the convex portion of the convexo-concave portion 62*k* of the second engaging part 62*b*, i.e., the tooth height is set to be, for instance, 0.6 mm.

As illustrated in FIG. 21, in the detection member 61 as described above, the first distance L1 between the pivot axis 61*g* of the detection member 61 and the position p1 set for detecting the wear-amount of the friction member is shorter than the second distance L2 between the pivot axis 61*g* of the detection member 61 and the position p2 set for disengaging the detection member 61 and the moving member 62 from each other. In other words, the position of the pin member 61*h*, i.e., the position of the pivot axis 61*g* is set for making the first distance L1 shorter than the second distance L2.

The first distance L1 herein corresponds to a distance between the pivot axis 61*g* of the detection member 61 and the position p1 in which the convex apex 61*t* of the detection portion 61*b* makes contact with the bottom of the first recess 4*c* of the fulcrum ring 4. On the other hand, the second distance L2 corresponds to a distance between the pivot axis 61*g* of the detection member 61 and the position p2 of the apex of the convex portion disposed closest to the detection portion 61*b* in the first engaging part 61*d*.

Figure 18:
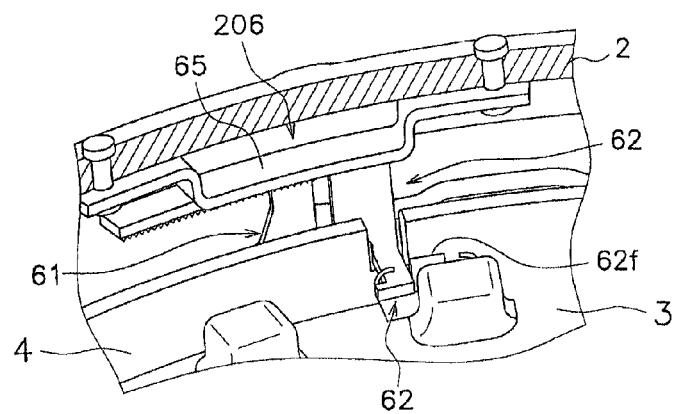
FIG. 18 is an enlarged perspective view of the wear-amount detecting mechanism (the third exemplary embodiment).

The moving member 62 is configured to be movable in accordance with the wear-amount. Specifically, as illustrated in FIGS. 18 and 21, the moving member 62 is urged by the first coil spring 62*f* in the first circumferential direction (the R1 direction in FIG. 21) and is thus configured to be movable in accordance with the wear-amount.

Specifically, as illustrated in FIGS. 19 and 20, the moving member 62 has the plate-shaped main body part 62*a*, the second engaging part 62*b* formed on one end of the main body part 62*a*, and the restriction portion 62*c* formed on the other end of the main body part 62*a*.

The second engaging part 62*b* is disposed between the detection member 61 and the positioning member 65. The second engaging part 62*b* is slidably disposed on the positioning member 65. Specifically, the second engaging part 62*b* is formed in a plate shape, and one surface thereof is disposed on the positioning member 65 whereas the other surface thereof can be engaged with the first engaging part 61*d*.

The restriction portion 62*c* is a portion to be engaged with the fulcrum ring 4. As illustrated in FIG. 21, the restriction portion 62*c* (a portion disposed inside the second recess 4*d*) has the width W2 in the circumferential direction. Here, where the restriction portion 62*c* is disposed in the second recess 4*d* of the fulcrum ring 4, the difference W3 between the circumferential inter-wall distance W1 in the second recess 4*d* and the rotation directional length W2 of the restriction portion 62*c* (W3=W1–W2) is set to be a predetermined value (e.g., 1.8 mm). In other words, where the restriction portion 62*c* makes contact with one wall of the second recess 4*d* of the fulcrum ring 4, the distance W3 between the other wall of the second recess 4*d* and the restriction portion 62*c* is set to be a predetermined value (e.g., 1.8 mm). The amount of rotational moving of the fulcrum ring 4 (the rotation amount of the fulcrum ring 4) is determined by the distance W3.

The first urging member 64 is a member for causing the detection member 61 to be engaged with the fulcrum ring 4. Further, the first urging member 64 is also a member for urging the detection member 61 in the direction of the clutch cover 2. When explained in detail, the first urging member 64 is also a member for urging the detection member 61 in the direction of the positioning member 65. Further, the moving member 62 is interposed and held between the detection member 61 and the positioning member 65 by the first urging member 64.

The first urging member 64 is attached to the inner surface of the clutch cover 2. The first urging member 64 is a member with elasticity. For example, a plate spring, a torsion coil spring or the like. is used as the first urging member 64. The torsion coil spring is herein used as the first urging member 64. The torsion coil spring 64 has a coil portion 64*a*, a first locking portion 64*b* extending from the coil portion 64*a*, and a second locking portion 64*c* extending from the coil portion 64*a*. The coil portion 64*a* is attached about a pivot pin 61*h* for attaching the detection member 61 to the attachment member 63, while being disposed between the detection member 61 and the attachment member 63. As illustrated in FIGS. 17, 20 and 21, the first locking portion 64*b* is engaged with a recessed portion 61*j* formed in the detection member 61. As illustrated in FIG. 20, the second locking portion 64*c* is engaged with the attachment member 63.

The detection member 61 is urged by the torsion coil spring 64 in a direction away from the pressure plate 3. In other words, the first engaging part 61d of the detection member 61 and the second engaging part 62b of the moving member 62 are engaged by the urging force of the torsion coil spring 64. Specifically, the convexo-concave portion 61k of the first engaging part 61d in the detection member 61 and the convexo-concave portion 62k of the second engaging part 62b in the moving member 62 are meshed by the urging force of the torsion coil spring 64.

[Wear Tracking Mechanism]

The wear tracking mechanism 7 is a mechanism for keeping the posture of the diaphragm spring 5 at its initial posture by tracking the wear-amount of the friction member. As illustrated in FIG. 12, in addition to the plural fulcrum rings 4, the wear tracking mechanism 7 includes the slide portions 10 and 11 respectively formed on the aforementioned pressure plate 3 and the fulcrum rings 4 and the second urging member 28.

In the structure as described above, when the moving member 62 is moved in the first circumferential direction in accordance with the wear-amount of the friction member, the fulcrum rings 4 are rotatable in the first circumferential direction by the displacement of the moving member 62. When the fulcrum rings 4 are herein rotated with respect to the pressure plate 3, the fulcrum rings 4 are moved towards the transmission because the both members 3 and 4 make contact with each other at the slopes of the slide portions 10 and 11 thereof.

[Action of Wear-amount Detecting Mechanism and Wear Tracking Action]

In the clutch-on (coupled) state, the pressure load of the diaphragm spring 5 acts on the pressure plate 3 through the fulcrum rings 4. Accordingly, the friction member of the clutch disc assembly is interposed and held between the pressure plate 3 and the flywheel. As illustrated in FIG. 12, the detection member 61 is herein engaged with the fulcrum rings 4. Specifically, the detection portion 61b of the detection member 61 makes contact with the bottom of the first recess 4c of the fulcrum ring 4. In FIG. 21, the reference sign p1 indicates the point in which the detection portion 61b of the detection member 61 makes contact with the bottom of the first recess 4c of the fulcrum ring 4.

When the friction member is abraded, the thickness of the friction member is reduced. Therefore, the pressure plate 3 is moved towards the flywheel. Further, when the pressure plate 3 is moved, the fulcrum rings 4 disposed on the pressure plate 3 are similarly moved towards the flywheel. Accordingly, the detection member 61 pivots about the pivot axis 61g as a fulcrum. The detection portion 61b of the detection member 61, engaged with the first recess 4c of the fulcrum ring 4, is moved in the moving direction of the fulcrum rings 4 (see FIG. 21). Further, the first engaging part 61d of the detection member 61 is herein moved in the moving direction of the fulcrum rings 4, i.e., a direction closer to the pressure plate 3.

Then, when the displacement of the first engaging part 61d of the detection member 61, i.e., the displacement of the position p2 of the apex of the convex portion located closest to the detection portion 61b becomes greater than or equal to a predetermined value (e.g., 0.6 mm), the first engaging part 61d of the detection member 61 and the second engaging part 62b of the moving member 62 are disengaged from each other. Accordingly, the moving member 62 becomes movable with respect to the pressure plate 3 in the first rotational direction (the R1 direction in FIG. 21) while the restriction portion 62c of the moving member 62 is disposed within the second recess 4d of the fulcrum ring 4. It should be noted that, when the detection member 61 pivots, the first engaging part 61d of the detection member 61 is constantly urged by the torsion coil spring 64 in a direction away from the pressure plate 3.

When the detection member 61 and the moving member 62 are subsequently disengaged from each other, the moving member 62 is moved in the first rotational direction by the urging force of the first coil springs 62f. Accordingly, in conjunction with the moving of the moving member 62, the restriction portion 62c of the moving member 62 is also moved within the second recess 4d of the fulcrum ring 4 in the first rotational direction. Then, the moving member 62 stops moving when the restriction portion 62c of the moving member 62 makes contact with the first circumferential directional wall of the second recess 4d of the fulcrum ring 4. Accordingly, the clearance W3, corresponding to the wear-amount of the friction member, is produced between second rotation directional wall of the second recess 4d and the restriction portion 62c of the moving member 62.

In the present wear-amount detecting mechanism 6, the fulcrum rings 4 are moved towards the flywheel together with the pressure plate 3 in accordance with the wear-amount of the friction member. When the detection member 61 and the moving member 62 are then disengaged from each other, the moving member 62 is moved by the distance W3 in the first rotational direction. Under the condition, the fulcrum rings 4 are pressed towards the pressure plate 3 by the diaphragm spring 5. Therefore, the fulcrum rings 4 are prevented from rotating and moving. In other words, in the clutch-on (coupled) state, the wear-amount of the friction member is only detected and moving of the fulcrum rings 4 for returning the posture of the diaphragm spring 5 to the initial posture, i.e., wear tracking is not executed.

It should be noted that, even if the detection member 61 pivots, the first engaging part 61d of the detection member 61 and the second engaging part 62b of the moving member 62 cannot be disengaged from each other when the displacement of the first engaging part 61d, i.e., the displacement of the position p2 of the apex of the convex portion located closest to the detection portion 61b is less than a predetermined value (see the state illustrated in FIG. 17). In other words, under the condition, the moving member 62 is immovable with respect to the pressure plate 3 in the first rotational direction.

Further, under the condition, the restriction portion 62c of the moving member 62 is engaged with the second recess 4d of the fulcrum ring 4. Therefore, the fulcrum rings 4 are immovable in the first rotational direction. More specifically, the fulcrum rings 4 are restricted from moving in the first rotational direction by causing the second rotation directional wall of the second recess 4d to make contact with the restriction portion 62c of the moving member 62 set in an immovable state.

Next, when a clutch-off (decoupled) state is produced by executing a clutch releasing operation, pressure of the diaphragm spring 5 onto the fulcrum rings 4 is released. Accordingly, the fulcrum rings 4 are rotated with respect to the pressure plate 3 in the first rotational direction by the second coil spring 28. Rotation of the fulcrum rings 4 is stopped when the wall (the second rotation directional wall) of the second recess 4d of the fulcrum ring 4 makes contact with the restriction portion 62c of the moving member 62.

The pressure plate 3 and the fulcrum rings 4 herein make contact with each other at the respective slide portions 10 and 11 (the slopes 10a and 11a). Therefore, the fulcrum rings 4 are moved in a direction away from the pressure plate 3 when being rotated as described above. In other words, the fulcrum rings 4 are moved towards the transmission by the wear-amount of the friction member. Through the moving, the fulcrum rings 4 are supposed to be returned to their initial positions where the friction member has not been abraded yet. In other words, the posture of the diaphragm spring 5 is returned to its initial posture.

Further, when the fulcrum rings 4 are moved towards the transmission, a clearance can be produced between the detection portion 61b of the detection member 61 and the bottom of the first recess 4c of the fulcrum ring 4. However, in the present exemplary embodiment, the first engaging part 61d of the detection member 61 is constantly urged by the torsion coil spring 64 in the direction away from the pressure plate 3. Therefore, even when the fulcrum rings 4 are moved towards the transmission, the detection portion 61b of the detection member 61 is configured to track moving of the fulcrum rings 4 while being abutted to the bottom of the first recess 4c of the fulcrum ring 4 by the urging force of the torsion coil spring 64. Further, at this time, the first engaging part 61d of the detection member 61 is engaged again with the second engaging part 62b of the moving member 62 by the urging force of the plate spring 64. Accordingly, the wear-amount detecting mechanism 6 can be actuated with the aforementioned configuration when the clutch-on (coupled) state is produced again.

It should be noted that the wear-amount of the friction member, i.e., the tracking amount of the fulcrum rings 4 (the displacement of the fulcrum rings 4 towards the transmission) with respect to the wear-amount is determined by the timing of disengaging the first engaging part 61d and the second engaging part 62b from each other, the displacement W3 of the moving member 62 and the slant angles of the slide portions 10 and 11. The timing of disengaging the first engaging part 61d and the second engaging part 62b from each other is determined by the shape and size of each convex portion and the shape and size of each concave portion. Further, the tracking amount of the fulcrum rings 4 with respect to the wear-amount of the friction member is determined by the magnitude of the displacement W3 of the moving member 62 and the slant angles of the slide portions 10 and 11. The wear-amount of the friction member and the tracking amount of the fulcrum rings 4 are herein set to be equal to each other.

Thus, in the present wear tracking mechanism 7, moving of the fulcrum rings 4 is executed when a clutch releasing operation is executed. Specifically, pre-moving preparation for the fulcrum rings 4, i.e., wear detection of the friction member is preliminarily executed in the clutch-on state (a state that the friction member is pressed onto the flywheel). Moving of the fulcrum rings 4, i.e., wear tracking is then executed when the clutch-off state (a state that pressure of the friction member onto the flywheel is released) is produced.

[Features]

(1) In the present clutch cover assembly 1, the wear-amount detecting mechanism 206 is attached to the inner side of the clutch cover 2. Therefore, it is not required to form an opening in the clutch cover for allowing the wear-amount detecting mechanism 206 to access the fulcrum rings 4. Therefore, stiffness of the clutch cover 2 can be further enhanced than the case that the wear-amount detecting mechanism 206 is attached to the outer side of the clutch cover 2.

(2) In the present clutch cover assembly 1, the detection portion 61b of the detection member 61 is disposed between the pivot axis 61g of the detection member 61 and the first engaging part 61d of the detection member 61. Therefore, the pivot direction of the detection portion 61b will be the same as that of the first engaging part 61d of the detection member 61. In other words, when the fulcrum rings are moved towards the flywheel, the detection portion 61b of the detection member 61 and the first engaging part 61d of the detection member 61 also pivot in the direction of the flywheel. Therefore, the first engaging part 61d of the detection member 61 and the second engaging part 62b of the moving member 62 can be reliably disengaged from each other by disposing the first engaging part 61d of the detection member 61 between the second engaging part 62b of the moving member 62 and the pressure plate 3.

(3) The present clutch cover assembly 1 can also achieve advantageous effects similarly to those achieved by the first exemplary embodiment.

OTHER EXEMPLARY EMBODIMENTS

The present invention is not limited to the aforementioned exemplary embodiments, and a variety of changes or modifications can be herein made without departing from the scope of the present invention.

(a) The wear tracking mechanism can be arbitrarily configured as long as it is configured to exert an action of keeping the initial posture of the diaphragm spring, and the configuration thereof is not limited to the configurations of the aforementioned exemplary embodiments.

INDUSTRIAL APPLICABILITY

In the present invention, the wear-amount detecting mechanism is attached to the clutch cover. Therefore, even when vibrations are inputted into the clutch cover assembly and the pressure plate is thereby vibrated, the wear-amount detecting mechanism can detect the wear-amount without being directly affected by vibrations of the pressure plate. Further, in the present invention, the wear-amount of the friction member can be accurately and reliably detected by the wear-amount detecting mechanism. Therefore, accurate wear compensation can be provided.

The invention claimed is:

1. A clutch cover assembly for pressing a friction member of a clutch disc assembly onto a flywheel of an engine and for releasing the pressing of the friction member, the clutch cover assembly comprising:
   a clutch being fixed to the flywheel;
   a pressure plate being coupled to the clutch cover, being non-rotatable relatively to the clutch cover, and being configured to press the friction member onto the flywheel;
   a pressing member being supported by the clutch cover and configured to press the pressure plate towards the flywheel;
   an wear-amount detecting mechanism being attached to the clutch cover, the wear-amount detecting mechanism including
      a detection member being configured to detect an wear-amount of the friction member, and
      a moving member being configured to be movable in accordance with the wear-amount; and
   an wear tracking mechanism including a fulcrum ring, the fulcrum ring being supported by the pressure plate, the fulcrum ring being configured to be axially movable, the fulcrum ring being configured to move the pressing member in a direction away from the pressure plate with a displacement of the moving member, the detection member being engaged with the fulcrum ring and being configured to detect the wear-amount through the fulcrum ring, the detection member being engaged with the moving member and being configured to be disengaged from the moving member, when the wear-amount reaches a predetermined amount, the moving member being configured to move, when the detection member is being disengaged from the moving member.

2. The clutch cover assembly recited in claim 1, wherein the wear-amount detecting mechanism further includes an attachment member, the attachment member is configured to attach the detection member to the clutch cover, and the detection member is pivotably attached to the attachment member and is configured to be disengaged from the moving member, when a pivot amount corresponding to the wear-amount reaches a predetermined value.

3. The clutch cover assembly recited in claim 2, wherein a distance between a pivot axis of the detection member and a position in which the wear-amount of the friction member is detected is shorter than a distance between the pivot axis of the detection member and a position in which the detection member and the moving member are disengaged from each other.

4. The clutch cover assembly recited in claim 1, wherein the wear-amount detecting mechanism further includes a first urging member, and the detection member is engaged with the fulcrum ring by the first urging member.

5. The clutch cover assembly recited in claim 1, wherein the detection member includes
- a detection portion being configured to detect the wear-amount, and
- a first engaging part being configured to be engaged with the moving member, the moving member includes
- a second engaging part being configured to be engaged with the first engaging part, and
- a restriction portion being configured to restrict and permit moving of the fulcrum ring, wherein the restriction portion is configured to be engaged with the fulcrum ring, and the fulcrum ring includes
- an wear detection recess with which the detection portion is engaged, and
- an wear tracking recess with which the restriction portion is engaged.

6. The clutch cover assembly recited in claim 5, wherein the wear-amount detecting mechanism further includes a first urging member, the detection member is configured to be engaged with the fulcrum ring by the first urging member, and the first engaging part of the detection member is disposed between the first urging member and the second engaging part of the moving member.

7. The clutch cover assembly recited in claim 6, wherein the wear-amount detecting mechanism further includes an attachment member, the attachment member is configured to attach the detection member to the clutch cover, and the detection member is pivotably attached to the attachment member, and a pivot axis of the detection member is configured between the detection member and the first engaging part.

8. The clutch cover assembly recited in claim 6, wherein the wear-amount detecting mechanism further includes an attachment member, the attachment member is configured to attach the detection member to the clutch cover, the detection member is pivotably attached to the attachment member, and the detection portion is configured between a pivot axis of the detection member and the first engaging part.

9. The clutch cover assembly recited in claim 1, wherein the wear-amount detecting mechanism is attached to the clutch cover and is disposed either between the pressure plate and the clutch cover or on an outer side of the clutch cover.

10. The clutch cover assembly recited in claim 1, wherein the wear tracking mechanism further includes
- first and second slide portions being respectively formed in the pressure plate and the fulcrum ring, wherein the first and second slide portions are configured to slide with each other, and
- a second urging member being configured to urge the fulcrum ring in a circumferential direction and rotate the fulcrum ring relatively to the pressure plate, the slide portions includes slopes which are slanted along the circumferential direction, the fulcrum ring is configured to be moved in a direction away from the pressure plate by rotating the second urging member in accordance with the displacement of the moving member.

* * * * *